(12) United States Patent
Fujita

(10) Patent No.: US 6,492,637 B1
(45) Date of Patent: Dec. 10, 2002

(54) DIMENSION MEASURING DEVICE

(75) Inventor: Hiroo Fujita, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/720,868

(22) PCT Filed: May 10, 2000

(86) PCT No.: PCT/JP00/02998

§ 371 (c)(1),
(2), (4) Date: Jan. 2, 2001

(87) PCT Pub. No.: WO00/68646

PCT Pub. Date: Nov. 16, 2000

(30) Foreign Application Priority Data

| | | |
|---|---|---|
| May 10, 1999 | (JP) | 11-128853 |
| Jun. 14, 1999 | (JP) | 11-166495 |
| Oct. 13, 1999 | (JP) | 11-290614 |
| Dec. 7, 1999 | (JP) | 11-347485 |

(51) Int. Cl.[7] .................. G01D 5/34; G01B 11/14
(52) U.S. Cl. ............... 250/231.13; 250/237 R; 250/237 G; 250/559.19; 250/559.29; 250/559.38; 356/614; 356/615; 356/616
(58) Field of Search ............... 250/231.13, 237 R, 250/237 G, 559.19, 559.29, 559.38; 356/614, 615, 616, 617, 618, 619

(56) References Cited

U.S. PATENT DOCUMENTS

| | | | | |
|---|---|---|---|---|
| 4,320,293 A | | 3/1982 | Guretzky | 250/231 |
| 4,519,709 A | * | 5/1985 | Nelle | 356/619 |
| 4,912,322 A | * | 3/1990 | Ichikawa | 250/237 G |
| 5,124,548 A | * | 6/1992 | Igaki | 250/231.16 |
| 5,260,568 A | * | 11/1993 | Ieki | 250/231.18 |
| 5,661,295 A | | 8/1997 | Fukui et al. | 250/231.14 |
| 5,841,133 A | * | 11/1998 | Omi | 250/231.13 |
| 5,889,280 A | * | 3/1999 | Matsuura | 250/237 G |
| 6,031,224 A | * | 2/2000 | Peterlechner | 250/231.13 |
| 6,175,414 B1 | * | 1/2001 | Holzapfel et al. | 356/620 |
| 6,285,023 B1 | * | 9/2001 | Uehira | 250/231.13 |
| 6,342,697 B1 | * | 1/2002 | Nagai et al. | 250/231.13 |

FOREIGN PATENT DOCUMENTS

| | | |
|---|---|---|
| JP | 57151859 | 9/1982 |
| JP | 01141308 | 6/1989 |
| JP | 1-154466 | 10/1989 |
| JP | 2-140413 | 11/1990 |
| JP | 03296618 | 12/1991 |
| JP | 05340767 | 12/1993 |
| JP | 08334526 | 12/1996 |

* cited by examiner

Primary Examiner—Robert H. Kim
Assistant Examiner—Allen C. Ho
(74) Attorney, Agent, or Firm—Finnegan, Henderson, Farabow, Garrett & Dunner, L.L.P.

(57) ABSTRACT

A dimension measuring apparatus comprises a moving member adapted to move for dimension measurement, a grid device for moving with the moving member, an optical device for irradiating the grid device, a light receiving device for receiving the light radiated from the optical device and transmitted through the grid device and for generating a non-sinusoidal wave signal in accordance with the movement of the moving member, and a processing device for measuring the moving distance of the moving member based on the non-sinusoidal wave signal.

43 Claims, 19 Drawing Sheets

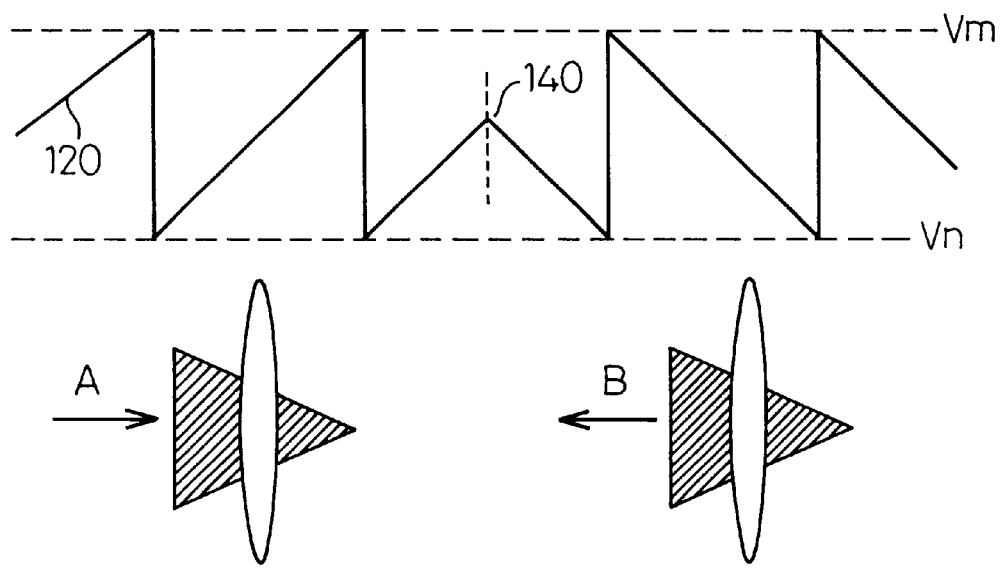

DIMENSION MEASURING DEVICE

TECHNICAL FIELD

The present invention relates to a dimension measuring apparatus for optically detecting the movement of an optical scale (grid) or, in particular, to a configuration of an optical system and a signal processing system of a dimension measuring apparatus.

BACKGROUND ART

In a production line for precision members, demand is strong for in-line non-contact type measurement of the distance traveled by a machining head or the size of a workpiece. As a simple measuring instrument often used for this purpose, an optical scale formed with a multiplicity of fine grids having a binary light transmission distribution of black and white at a predetermined pitch is mounted on a probe, and the moving distance of the probe is optically read.

FIG. 21A shows an example of a configuration of a conventional dimension measuring apparatus 700. The light emitted from a light source 701 such as a white lamp or a light-emitting diode (LED) is radiated on an optical scale 710 through a collimating lens 702. The optical scale 710 is configured with three grids including a moving grid 703 and stationary grids 704A, 704B. The moving grid 703 is mounted on a probe (not shown), and is adapted to move in the directions A, B indicated by arrows with the movement of the probe. The stationary grids 704A, 704B are fixed at a specific position behind the moving grid 703.

The moving grid 703 and the stationary grids 704A, 704B each have a rectangular pattern of binary (black and white) light transmission distribution formed on a glass substrate, and have the same shape and the same pitch. FIG. 21B shows an example 715 of a light transmission distribution of a grid. A black pattern 716 transmitting a small amount of light and a white pattern 718 transmitting a large amount of light are both rectangular in shape and formed alternately. One pitch of the grid has a length of a, and the width of the black pattern and the white pattern are both a/2. Normally, a grid of a=10 μm is used.

The stationary grid 704A is arranged so that it is shifted by one fourth of a pitch of the grid length with respect to the stationary grid 704B, and two photodetectors 705A, 705B are arranged behind the stationary grids 704A, 704B, respectively. The photodetector 705A outputs an A-phase signal 720, and the photodetector 705B outputs a B-phase signal 725. The A-phase signal 720 and the B-phase signal 725 (hereinafter collectively referred to as the two-phase signals) both have the transmitted light intensity changed sinusoidally with the movement of the moving grid 703. Since the grid positions of the stationary grids 704A and 704B are shifted by one fourth of a pitch, the phases of the A-phase signal 720 and the B-phase signal 725 are shifted by $\pi n/2$ from each other.

In the case where the grids having the configuration described above are irradiated with parallel light rays, the distance L between the moving grid 703 and the stationary grids 704A, 704B is required to be set to a specific value (Fourier image distance) determined by the relation between the wavelength of the light source 701 and the length a of one pitch of the grid. The Fourier image is defined as a light transmission distribution substantially equivalent to the geometric shape of the moving grid 703 irradiated with parallel light rays from the light source 701. In the case where the wavelength λ of the light source is 0.7 μm and the grid pitch length a is 10 μm, L is about 140 μm. The light transmission distribution at a position different from the Fourier image surface has a deteriorated contrast, and therefore the two-phase signals are required to be measured with high contrast by disposing the stationary grids 704A, 704B at the Fourier image distance of the moving grid 703.

The signal processing will be explained with reference to the waveform examples 720 and 725 shown in FIG. 21C. The A-phase signal 720 and the B-phase signal 725 are both a sinusoidal wave which moves one cycle when the moving grid 703 moves one pitch of its grid length. In FIG. 21C, the phase of the A-phase signal 720 is π/2 ahead of the phase of the B-phase signal 725. An example is the case in which the probe begins to move at a position 741 and stops at a position 742. The moving distance from position 741 to position 742 is the dimension to be measured, and for the measurement, the moving distance equal to an integral multiple of one pitch of the grids and the moving distance not longer than one pitch of the grids are both required to be detected.

A sinusoidal wave number counter 731 in FIG. 21A counts one signal for each cycle of the sinusoidal wave and thereby counts the number (integer) of pitches of the moving grid 703. For example, the number is counted for each period of the sinusoidal wave assuming the mesial intensity position (743, 745, 746, etc.) of the amplitude of the A-phase signal 720 as a trigger point. For detecting the number, it is necessary to determine the direction in which the moving grid 703 moves, and the direction of movement is determined from the lead and lag of the phase between the two-phase signals. In the case where the phase of the A-phase signal 720 is advanced, for example, the number is counted upward, while in the case where the B-phase signal 725 is advanced, the number is counted downward.

The moving distance not more than one pitch of the grid is the distance La between the movement start position 741 and the reference position 743, and the distance Lb between the reference position 746 and the stop position 742. The resolution and accuracy of the dimension measurement are determined by the accuracy of detection of the distances La, Lb. Therefore, it is important how finely one cycle of the sinusoidal wave is segmented for detecting the grid stop position. In view of this, the phase of the sinusoidal wave corresponding to the positions 741 and 742 is detected from the intensity of the sinusoidal wave. For attaining the resolution of 0.1 μm in the case where the length a of one pitch of the grid is 10 μm, for example, the phase is required to be detected by segmenting one pitch of the grid into 100 parts.

A phase quadrant determination unit 732 determines the phase quadrant (1 to 4) of the sinusoidal wave from the relation of the intensity of the two-phase signals between the grid stop positions 741 and 742. It is determined that the phase of the A-phase signal 720 is in the second quadrant ($\pi n/2$ to π) and the phase of the B-phase signal 725 is in the third quadrant (π to 3/2π) at the position 741. The phase detector 733 standardizes the amplitude of both the A-phase signal 720 and the B-phase signal 725 as the magnitude of ±1 and, based on the standardized intensity (Va, Vb), detects the phase of the grid stop positions 741, 742 from the arc tangent (Va/Vb) equation, for example. In the process, a trigonometric function table 734 for storing the tangent values of the trigonometric function is prepared, and the phase is determined by referring to the values in the table.

In the case where the phase detected at the grid stop position 742 is φ, for example, the distance not more than one grid pitch is Lb=aφ/(2π). The same applies to the distance La. In the case where the grid pitch a is segmented into 100 parts for detection, the phase is required to be detected with an error of not more than 3 degrees. The dimension calculation unit 735 calculates the dimension from the sum of the moving distance equal to an integer multiple of one grid pitch detected by the sinusoidal wave signal number counter 731 and the moving distance not more than one grid pitch detected by the phase detector 733. In this way, the conventional dimension measuring apparatus is based on the measurement of the intensity of the two-phase sinusoidal wave signals by generating the same signals.

As described above, the conventional dimension measuring apparatus is so configured that one grid pitch length and the grid shape of both the moving grid and the stationary grid are equalized, and two-phase sinusoidal wave signals of the phases different by π/2 are generated. For improving the resolution of the dimension measurement, one grid pitch is required to be segmented finely and the stop position of the moving grid is required to be accurately detected. For this purpose, the phase of the sinusoidal wave is detected. In the case where the intensity of the A-phase signal is Va and the intensity of the B-phase signal is Vb, the phase is detected from the arc tangent (Va/Vb). In the area where the intensity of the sinusoidal wave is substantially maximum or minimum, however, the intensity changes broadly (the intensity change is small as compared with the phase change) and therefore the problem is posed that the error of phase calculation increases and the dimension measurement accuracy is reduced.

When calculating the phase from the arc tangent (Va/Vb), the amplitude of the A-phase signal is required to be accurately coincident with that of the B-phase signal. For this purpose, fine adjustment of the gain of the photoelectric conversion and the standardization of the intensity of the two-phase signals are required. Also, when converting the arc tangent value into the phase, it is necessary to refer to a trigonometric function table and calculate a series development equation thereby to calculate the phase. The resulting problem is that both the hardware and the software are complicated. Another problem is that in the case where the interval between the moving grid and the stationary grid undergoes a change and the detected two-phase signals are modulated from the sinusoidal wave, the grating position fails to correspond to the phase, thereby causing an error of dimension measurement.

Further, in the conventional dimension measuring apparatus, the grid pitch is shortened (to 10 μm, for example) to improve the measurement resolution. In the case where one grid pitch length is 10 μm, the measurement with a high contrast of light intensity makes it necessary to maintain the gap between the moving grid and the stationary grid at about 140 μm (Fourier image distance). In such a case, the tolerable clearance for setting the gap is not more than ±10 μm. As a result, the problem is also posed that the conditions are severe for setting the grid interval for obtaining a light intensity signal high in contrast. This problem becomes more salient with the decrease in the grid pitch length. Still another problem is that the moving grid is required to be irradiated with parallel light rays using a lens to form a Fourier image, resulting in a bigger optical system.

In view of this, in order to solve the aforementioned various problems caused by the use of two-phase sinusoidal wave signal, an object of the present invention is to detect the position where the grid begins to move or stops with a simple signal processing system based on non-sinusoidal wave signal for an improved measurement accuracy and an improved measurement reliability.

Another object of the invention is to reduce the size of and simplify the optical system by a configuration in which only one-phase signal is generated using only one moving grid and one photodetector.

Still another object of the invention is to reduce the size of and simplify the optical system by a configuration in which only one-phase signal is generated using two-phase gratings including one moving grid, one stationary grid and only one photodetector.

Yet another object of the invention is to detect the moving distance of not more than one grid pitch and the direction of movement the grid is detected with a simple signal processing system based only on a one-phase signal for an improved measurement accuracy and an improved measurement reliability.

A further object of the invention is to differentiate the grid pitch length of the moving grid and the stationary grid, generate a non-sinusoidal wave signal so that its intensity changes substantially linearly and it has a effect of reducing the diffractive expansion of the light, and detect the position at which the grating begins to move or stop based on this signal for an improved measurement accuracy and an improved measurement reliability.

DISCLOSURE OF THE INVENTION

In order to solve the problems described above, a dimension measuring apparatus according to this invention comprises a moving member moved for dimension measurement, grid means for moving with the moving member, optical means for radiating the grid means, a light receiving means for receiving the light radiated from the optical means and transmitted through the grid means and generating a non-sinusoidal signal in accordance with the movement of the moving member, and a processing means for measuring the moving distance of the moving member based on the non-sinusoidal wave signal.

Also, a dimension measuring apparatus according to this invention comprises a moving member moved for dimension measurement, grid means for moving with the moving member and having such a pattern that the light transmission distribution continuously changes along the longitudinal direction, optical means for radiating the grid means, a light receiving unit for receiving the light radiated from the optical means and transmitted through the grating means and generating a one-phase signal in accordance with the movement of the moving member, and a processing means for measuring the moving distance of the moving member based on the one-phase signal.

Further, the one-phase signal is preferably a non-sinusoidal wave signal.

Furthermore, preferably, the apparatus comprises one moving grid having a pattern alternating at a predetermined pitch, and the optical means is a laser optical system for radiating a laser beam having a sheet-like spot shape which has a width smaller than the length of the predetermined pitch.

In addition, preferably, the grid means is configured with a first grid having a translucent portion and an opaque portion alternating at a predetermined pitch along the longitudinal direction, and a second grating having a pattern repeated at a predetermined pitch, wherein the first or second grid moves with the moving member while the other is fixed.

What is more, preferably, the grid means is configured with a moving grid moved with the moving member and having a translucent portion and an opaque portion alternating at a first pitch along the longitudinal direction, and a stationary grid having a pattern repeated at a pitch different from the first pitch.

Also, a dimension measuring apparatus according to this invention comprises a moving member moved for dimension measurement, grid means for moving with the moving member, optical means for radiating the grid means, a light receiving means for receiving the light radiated from the optical means and transmitted through the grating means and generating an output signal in accordance with the movement of the moving member, and a processing means for generating a temporally digitized signal by sampling the output signal and measuring the moving distance of the moving member by counting the number of the digitized signals.

Further, the output signal is preferably a non-sinusoidal wave signal.

Furthermore, preferably, the grid means is configured with a first grid having a translucent portion and an opaque portion alternating at a predetermined pitch along the longitudinal direction, and a second grid having a such a pattern repeated at a predetermined pitch that the light transmission distribution continuously changes along the longitudinal direction, wherein the first or second grid moves with the moving member while the other is fixed as a stationary grid, the output signal is a one-phase signal, and the processing means measures the moving distance of the moving grid not more than a predetermined pitch by counting the number of digitized signals.

In addition, preferably, the grid means is configured with a moving grid moved with the moving member and having a translucent portion and an opaque portion alternating at a first pitch along the longitudinal direction, two stationary grids having a translucent portion and an opaque portion alternating at a second pitch different from the first pitch along the longitudinal direction, the light receiving unit includes two photodetectors corresponding to the two stationary grids, respectively, the output signal is a two-phase signal, and the processing means generates two digitized signals corresponding to the two-phase signals, respectively.

Also, a dimension measuring apparatus according to this invention comprises a moving member moved for dimension measurement, a moving grid for moving with the moving member and having a translucent portion and an opaque portion alternating at a first pitch along the longitudinal direction, two stationary grids having a translucent portion and an opaque portion alternating at a second pitch different from the first pitch along the longitudinal direction and arranged one fourth of the second pitch apart from each other, optical means for radiating the moving grid and the stationary grids, two light receiving units for receiving the light radiated from the optical means and transmitted through the stationary grids and generating two-phase output signals in accordance with the movement of the moving member, and a processing means for measuring the moving distance of the moving member based on the two-phase output signals.

EFFECTS OF THE INVENTION

According to this invention, the positions where the grid begins to move and stops are detected by a simple signal processing system based on a non-sinusoidal wave signal without using two-phase sinusoidal wave signals so that the accuracy and reliability of measurement can be improved.

Also, according to this invention, only a non-sinusoidal wave one-phase signal is generated using one moving grid and one photodetector or one moving grid, one stationary grid and one photodetector, and therefore the apparatus can be reduced in size and simplified.

Further, the one-phase signal generated from the photodetector is an asymmetrical signal, and therefore the direction in which the grid moves can be easily detected by the one-phase signal alone.

Furthermore, according to this invention, the grid pitch of the moving grid can broadened as compared with the prior art. Therefore, the diffractive expansion due to the grid has a smaller effect, and it becomes possible to output a non-sinusoidal wave signal having a wider area linearly changing with the intensity of the transmitted light, thereby making it possible to detect the grid position easily with a non-sinusoidal wave signal. Further, the fact that the grid pitch of the moving grid can be increased as compared with the prior art permits the grid to be irradiated directly by the light radiated from the light source. Thus a collimator lens or the like is eliminated, and the apparatus can be reduced in size.

In addition, the invention is so configured that digitized signals are generated from the output signal of the photodetector and the number of the digitized signals is counted. Even in the case where the intensity of the output signal is varied or the output signal assumes a nonlinear form, therefore, the grid position can be detected without a reference table or a complicated calculation.

What is more, according to this invention, two-phase digitized signals generated from two-phase output signals can be selectively used. Therefore, the grid position can be easily detected using the linear area of the signal alone.

BRIEF DESCRIPTION OF THE DRAWINGS

FIG. 3 is a diagram showing an example of detecting the inversion of the moving direction of the grid in a dimension measuring apparatus according to the first embodiment of the invention.

Figure 1A:
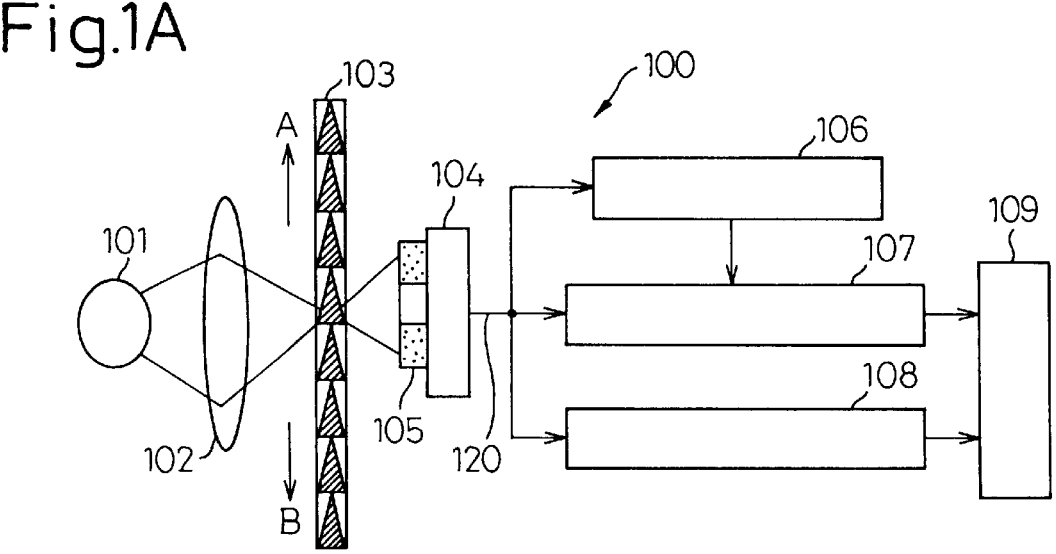
FIG. 1A is a diagram schematically showing a dimension measuring apparatus according to a first embodiment of the present invention.

DETAILED DESCRIPTION OF THE INVENTION (First Embodiment)

A first embodiment will be described below.

The optical system of a dimension measuring apparatus according to the first embodiment uses only one moving grid formed with a multiplicity of grid units in a specified shape having a non-rectangular light transmission distribution and one photodetector. Also, the optical system is configured in such a manner that the laser beam condensed into a specified beam shape is irradiated on the moving grid to output one (one-phase) non-sinusoidal wave signal. The optical scale includes only one moving grid and has a configuration of a non-coherent type for directly detecting the laser beam that has been transmitted through the moving grid.

The signal processing system of the dimension measuring apparatus according to the first embodiment, on the other hand, is configured in such a manner that the moving direction of the grid is determined from the intensity change of the one-phase signal to count the integral number of the grid units. At the same time, the position where the grid stops is detected directly from the intensity value of the one-phase signal at the positions where the grid stops before and after the movement of the grid, while the moving distance not more than one grid pitch is measured with an accuracy obtained by finely segmenting one grid pitch into at least 100 parts.

Each grid unit making up the moving grid has a binary (black and white) light transmission distribution, and one pitch of each grid unit has the same length and the same pattern of light transmission distribution. At the same time, one pitch of each grid unit is internally so formed that the light transmission distribution is changed continuously in the direction of grid movement. By the way, in all the embodiments described below, unless otherwise specified, "the continuously changing shape" is assumed to indicate a grid shape having at least a portion in which the light transmission distribution continuously changes. In this case, the pattern is set to such a triangular shape that the width between the two sides of the triangle continuously increases or decreases in the direction of grid movement to assume a light transmission distribution asymmetrical with respect to the direction in which the grid moves. This geometric asymmetry effectively causes the intensity of the one-phase signal to change continuously asymmetrically with respect to the direction in which the grid moves, as described later.

The grids having the aforementioned shape are irradiated with a one-dimensional (1D) sheet-like laser beam. The laser beam has a spot having different diameters in the direction of grid movement and the direction orthogonal thereto and a smaller diameter than the length of one pitch of the grid along the direction of grid movement. The spot shape is set in accordance with the length of one pitch of the grid, the light transmission distribution of the grid, etc. By the way, the sheet-like laser beam is used by reason of the fact that the light transmission distribution of the grid has a laterally asymmetric shape with respect to the center line of one pitch perpendicular to the longitudinal direction of the grid.

In the case where a single photodetector is used for detecting the laser beam transmitted through the moving grid, the transmitted light is required to be detected with a satisfactory S/N ratio. For this purpose, a slit or a pinhole is formed on the single light receiving surface of the photodetector to detect only a partial range containing the central portion of the intensity distribution of the transmitted light. This selective detection can not only cut off the unrequired light due to the diffraction or scatter attributable to the fine grid structure but also produce the confocal detection effect known in the field of microscopes. Another effect is that the spatial resolution dependent on the spot diameter of the radiated laser beam can be further improved, i.e. the change of the light transmission distribution of the grid can be detected with high sensitivity.

With the movement of the grid, a one-phase signal with the intensity continuously changing within one pitch of the grid is obtained from the relation between the light transmission distribution of the grid and the shape of the spot of the radiated laser beam. In the case where the light transmission distribution of the grid is triangular as described above, for example, the grid movement can produce a saw-toothed wave signal (hereinafter referred to as a ramp wave signal), which is a kind of non-sinusoidal wave signal, with the intensity linearly changing. In all the embodiments described below, the non-sinusoidal wave signal is defined as such a signal that the signal intensity thereof linearly changes within a range except for the portion associated with the maximum or minimum signal intensity. When the signal intensity changes linearly, it indicates that there exists an area where the absolute value of the differentiated intensity continues to assume a substantially constant value larger than 0. Such an area preferably represents at least 50% of one period of the signal. Also, the saw-toothed wave signal changes by one period for each pitch of the grid. The one-phase ramp wave signal, on the other hand, changes in such a manner that the intensity change thereof is inverted in the case where the direction in which the grid moves is inverted. For generating a one-phase signal having such a characteristic, the light transmission distribution is configured asymmetrically with respect to the direction in which the grid moves.

The radiated laser beam has a Gauss-type intensity distribution. Depending on the relation between the maximum width of the grid pattern along the direction perpendicular to the direction in which the grid moves and the magnitude of the spot diameter of the radiated laser beam along the same direction, the modulation due to the Gauss distribution may have the effect of non-linearly changing the intensity of the ramp wave signal deviating from the straight line. In such a case, the shape of at least one side of the triangle described above is corrected by a curve of the opposite characteristic so that the nonlinearity of the one-phase signal intensity is corrected thereby to output a linearly changing signal.

The intensity of the ramp wave signal changes asymmetrically with respect to the direction of movement in such a manner as to increase or decrease the intensity linearly in accordance with the moving direction of the grid. Thus, the moving direction of the grid is determined by detecting the direction in which the intensity of the one-phase signal changes (increases or decreases). In the case where the intensity changes upward followed by the intensity change downward at an intermediate intensity position, for example, it is determined that the moving direction of the grid is inverted. Also, an integral number of grid units is counted with the position of minimum intensity of the ramp wave signal as a reference position for counting. At the same time, the count of the integral number is increased or decreased according to the direction of movement thereby to detect the moving distance as an integer multiple of one grid pitch.

The dimension measuring apparatus according to the first embodiment is effective for detecting the moving distance of not more than one pitch of grid unit. This is by reason of the fact that the intensity of the ramp wave signal corresponds linearly to the grid position. Assume that the difference between maximum intensity and minimum intensity of the ramp wave signal is Vo after movement of one pitch. The reference length of one pitch is given as Vo. Assuming that the difference between the minimum intensity and the intensity of the ramp wave signal detected at the positions where the grid starts to move and stops are Vs and Vp, respectively, the positions where the grid begins to move and stops are detected from the proportional relation between the signal intensity and the grid position, and the moving distance of not more than one pitch can be measured. In this way, the moving direction of the grid can be determined by the one-phase signal alone, and the grid position can be detected directly from the intensity of the one-phase signal based on a simple linear relation.

The first embodiment will be explained in detail with reference to FIG. 1A. In FIG. 1A, numeral 100 designates a general configuration of a dimension measuring apparatus. A laser beam light source 101 includes a semiconductor laser. The emitted laser beam is collected by a collective lens 102 and radiated on a moving grid 103. The laser beam light source 101 and the collective lens 102 are called a laser beam radiation unit. The spot generated by the laser beam radiation unit is set to a shape corresponding to the shape of the moving grid 103 as described later. The moving grid 103 is arranged at the focal point of the collective lens 102, mounted on a probe (not shown), and adapted to move in the directions A and B indicated by arrows.

Figure 1B:
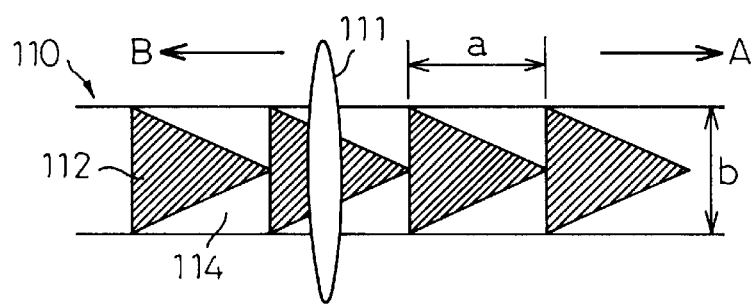
FIG. 1B is a diagram showing an example of the light transmission distribution of the grids in FIG. 1A.

Each grid unit making up the moving grid 103 has a non-rectangular pattern having a binary (black and white) light transmission distribution so shaped that the light transmission distribution changes continuously along the moving direction of the grid. An example of the light transmission distribution 110 of the grid is shown in FIG. 1B. The shape of the black pattern 112 not translucent within one pitch (one period) and the shape of the translucent white pattern 114 continuously changes along the moving direction of the grid. The length of one pitch is a. This light transmission distribution in one pitch is formed periodically over the entire moving grid 103.

Figure 1C:
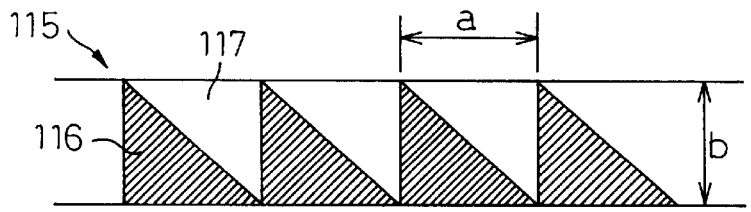
FIG. 1C is a diagram showing another light transmission distribution of the grids in FIG. 1A.

The black pattern 112 is triangular in shape and so configured that the width between the two sides of the triangle continuously changes along the moving direction of the grid and thus has a light transmission distribution asymmetrical in the moving direction of the grid. By the way, the pattern width along the direction orthogonal to the moving direction of the grid is given as b. A light transmission distribution 115 is shown in FIG. 1C as another example of the configuration of the light transmission distribution. Also in this case, the black pattern 116 is triangular in shape and has the same characteristic as the aforementioned example. Numeral 117 designates a white pattern similar to the aforementioned one. A sheet-like (elongate ellipse) laser beam 111 is radiated on the grid having the above-mentioned shape. The shape of the sheet-like beam is set in accordance with the length a of one pitch and the width b in the direction perpendicular to the moving direction of the grid.

The diameter of the radiation spot of the sheet-like beam 111 along the longitudinal direction of the moving grid is preferably smaller than the length a of one pitch and not more than about a/3. Also, the spot diameter along the width of the moving grid is preferably sufficiently longer than the width b. A cylindrical lens is required for generating such a sheet-like beam. For this reason, the collective lens 102 of the laser beam radiation unit is preferably configured not with one lens for collecting the circular beam but with a plurality of lens systems including a cylindrical lens.

The laser beam that has been transmitted through the moving grid 103 is received by the photodetector 104 including a single light receiving surface. The optical system according to the invention detects the transmitted light from one moving grid with a single photodetector and therefore is configured as a non-coherent type. When detecting the transmitted light by the photodetector 104, the intensity of the transmitted light proceeding while being diverged may be directly detected, or as an alternative, another collective lens is interposed between the moving grid 103 and the photodetector 104 to detect by collecting the divergent light again. In this case, the intensity of substantially the whole area of the transmitted laser beam is detected.

As another alternative, a slit 105 is applied to the light receiving surface of the photodetector 104 for detection. In this case, only the area of high intensity including the central portion of the laser light beam entering the slit 105 is transmitted and detected. Instead of the slit 105, a pinhole may be used. The detection using the slit 105 can remove the unrequired diffracted light and the scattered light due to the fine grid structure, and makes it possible to detect the transmitted light with a satisfactory S/N ratio. Further, the spatial resolution is improved due to the confocal effect.

Figure 1D:
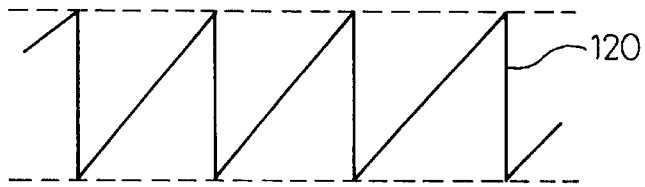
FIG. 1D is a diagram showing an example of a signal waveform in FIG. 1A.

The signal corresponding to the intensity of the transmitted light output from the photodetector 104 is one (one-phase) signal. An example of the waveform of the one-phase signal 120 is shown in FIG. 1D. In the case where the grid has a triangular shape as designated by 110, the one-phase signal 120 is a ramp wave signal with the intensity thereof linearly changing in saw-toothed form along the moving direction of the grid. The ramp wave signal is determined from the relation between the light transmission distribution of the grid and the spot diameter of the radiated laser beam, so that movement of the moving grid by the distance equivalent to one pitch changes the ramp wave signal by one cycle. Incidentally, the intensity of the ramp wave signal sharply changes at turning point of the cycle, and therefore this signal is asymmetrical along the moving direction of the moving grid 103. This asymmetry of the intensity change is effective for detecting the moving distance of the grid as described later.

The signal processing system for processing the data for the one-phase signal 120 includes a moving direction determination circuit 106, an integral pitch distance detector 107, a fraction pitch distance detector 108 and a dimension calculator 109. The intensity of the one-phase signal 120 changes linearly with the movement of the moving grid 103, and therefore directly corresponds to the grid position. Further, when the moving direction of the moving grid 103 is inverted, the direction in which the intensity changes is also inverted, and therefore the aforementioned various detections are made possible with the one-phase signal 120 alone.

The movement direction determination unit 106 detects the inversion (inversion from direction A to direction B, for example) of the moving direction of the moving grid, by detecting the inversion of the direction in which the intensity change. The integral pith distance detector 107 detects the number n (n: integer) of pitches of the moving grid and thus calculates the moving distance na which is an integer multiple of the one-pitch length. While the position where the intensity of the ramp wave signal changes from maximum to minimum is set as a reference position for counting, for example, the count is changed upward or downward by the movement of the moving grid by one pitch. This upward or downward change is performed in accordance with the moving direction of the grid.

One of the features of the method using the one-phase signal 120 is the detection of the moving distance of not more than the length a of one pitch of the moving grid. The fraction pitch distance detector 108 detects the moving distance of not more than one pitch length a of the moving grid. In this detection, the grid position is detected directly from the intensity of the one-phase signal for each of the position where the moving grid begins to move and the position where the movement stops. The dimension calculation unit 109 calculates the dimension by measuring the moving distance of the probe from the sum of the moving distance equivalent to an integral multiple of one pitch of the moving grid detected by the integral pitch distance detector 107 and the moving distance not more than one pitch of the moving grid detected by the fraction pitch distance detector 108.

Figure 2A:
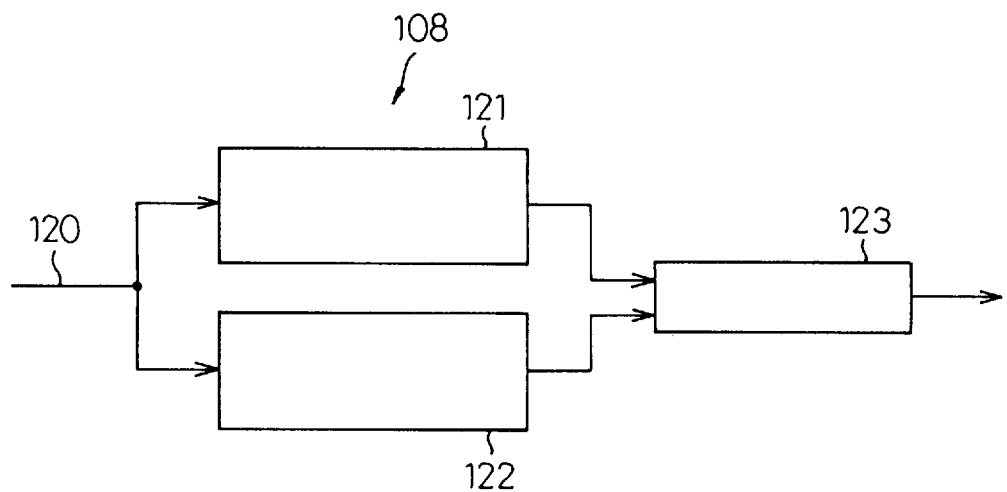
FIG. 2A is a diagram showing a fraction pitch detector of a dimension measuring apparatus according to the first embodiment of the invention.
Figure 2B:
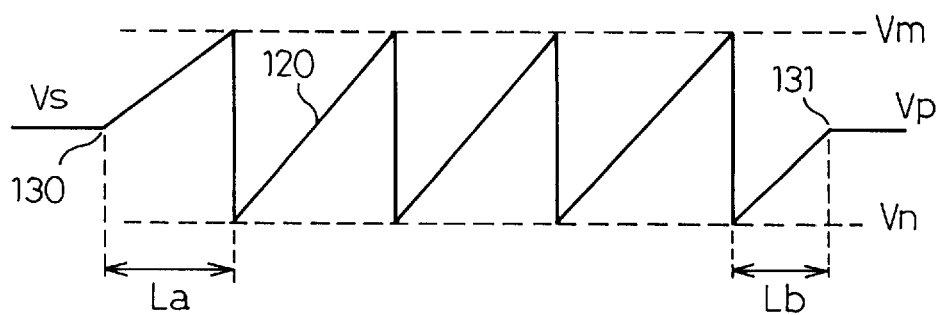
FIG. 2B is a diagram showing an example of a signal waveform in FIG. 2A.

FIG. 2A shows an example of the configuration of the fraction pitch distance detector 108 for detecting the moving distance of not more than one pitch of the moving grid. The operation of the fraction pitch distance detector 108 will be explained with reference to another example of the waveform of the one-phase signal 120 shown in FIG. 2B. In the waveform example of the one-phase signal 120, assume that the moving grid began to move at the position 130 and stopped at the position 131. The grid stop position intensity detector 121 detects and stores the ramp wave signal intensities Vs and Vp at the movement start position 130 and the stop position 131, respectively. The maximum/minimum intensity storage unit 122 detects and stores the maximum intensity Vm and the minimum intensity Vn of the ramp wave signal. A reference intensity Vo=Vm−Vn provides a reference length of one pitch of the moving grid 103. The reference intensity Vo is a value corresponding to the light transmission distribution and the intensity distribution of the radiated laser beam.

The intensity of the ramp wave signal linearly changes, and therefore the intensity value directly corresponds to the position of the moving grid in one pitch, so that one is proportional to the other. Thus, the proportional calculation unit 123 detects the moving distance of not more than the length of one pitch of the moving grid from the proportional relation La=a(Vs−Vn)/Vo and Lb=a(Vp−Vn)/Vo between the intensities Vs and Vp at the movement start position 130 and the stop position 131 detected by the proportional calculation unit 123 and the reference intensity Vo. In the case where the intensity Vm, Vn undergoes a change during the movement of the moving grid, the maximum and minimum intensities of the area for the several cycles immediately after the start of movement of the moving grid and the several periods immediately before the stop of the movement are individually detected and stored, and by using these values, the above-mentioned proportional calculation is performed thereby to detect the moving distance La, Lb.

In the one-phase ramp wave signal 120 obtained in this invention, the signal intensity is advantageously proportional to the position of the moving grid in one pitch, so that the position of the moving grid can be detected by the aforementioned simple proportionality equation. Once the intensity of the one-phase signal is detected with an 8-bit resolution, for example, the grid position can be detected with an accuracy of one period of the ramp wave signal segmented into about 200 parts. Thus, the object of measuring the dimension with a resolution of one grid pitch segmented into 100 parts can be sufficiently achieved.

FIG. 3 shows another example of a waveform of the one-phase signal 120, with reference to which a method of detecting the inversion of the moving direction of the grid by the moving direction determination unit 106 will be explained. In the case where the signal intensity increases rightward in the waveform diagram, the moving grid is moving in direction A. When the intensity increases from the minimum intensity Vn followed by the sharp change from the maximum intensity Vm to the minimum intensity Vn, it is determined that the grid has moved one pitch in the same direction. In the case where the direction in which the signal intensity changes is inverted downward at the position 140, it is determined that the direction of movement is inverted at the position 140 and the grid moves in direction B. At the same time, by detecting the differential intensity providing the intensity difference between adjacent two points in the one-phase signal 120 and the positive or negative sign thereof, the aforementioned intensity inversion can be easily detected.

Figure 4A:
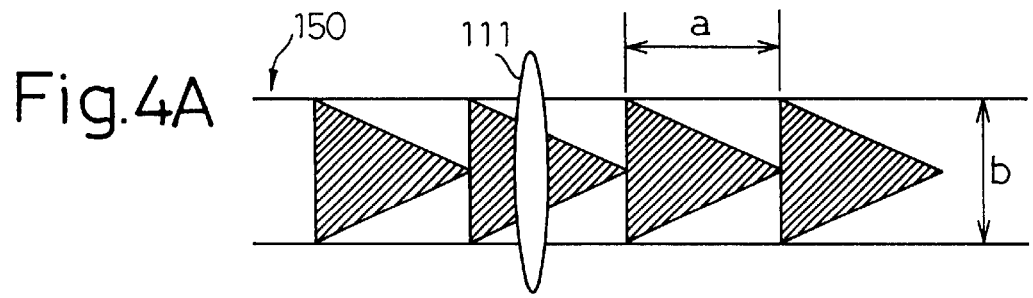
FIG. 4A is a diagram showing an example of the light transmission distribution of a moving grid of a dimension measuring apparatus according to the first embodiment of the invention.

What is important in the dimension measuring apparatus according to the invention lies in that the intensity of the one-phase signal and the position of the moving grid are in linear relation to each other (the intensity of the one-phase signal linearly changes). As a result, it is important to set the light transmission distribution of the moving grid correctly. Apart from FIG. 1B showing an example of the triangular pattern 110, FIG. 4A shows an example of a different shape of the signal like the example shown in FIG. 1B. In FIG. 4A, numeral 150 designates the same triangular grating pattern as the one shown in FIG. 1B. The intensity distribution of the laser beam 111 radiated on the moving grid is the Gauss-type distribution. In the case where the difference is small between the width b in the direction perpendicular to the moving direction of the moving grid and the diameter of the laser spot in the same direction, the intensity of the ramp wave signal is modulated under the effect of the Gauss distribution.

Figure 4B:
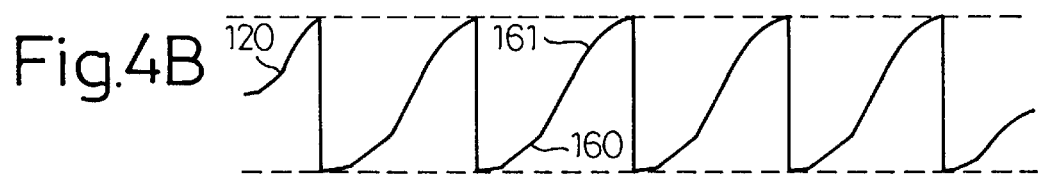
FIG. 4B is a diagram showing an example of a signal waveform in a dimension measuring apparatus according to the first embodiment.

The waveform of the one-phase signal 120 shown in FIG. 4B is an example of the intensity-modulated ramp wave signal. In this case, the intensity of the one-phase signal 120 changes not linearly but nonlinearly. The nonlinearity is conspicuous especially in the neighborhood of the area 160 small in intensity and the area 161 large in intensity. In the case where the signal intensity changes nonlinearly, the relation between the signal intensity and the position of the moving grid is also nonlinear, with the result that the data processing for detecting the position of the moving grid is complicated. According to this invention, a linear one-phase signal is generated by correcting the triangular light transmission distribution of the grid.

Figure 4C:
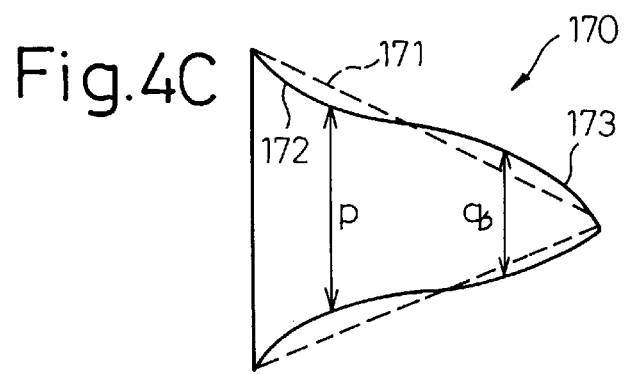
FIG. 4C is a diagram showing an example of correcting the light transmission distribution.

In FIG. 4C, numeral 170 designates an example of the light transmission distribution in a corrected shape. A dashed line 171 indicates the sides of a triangle before correction, and lines 172 and 173 indicate the sides after correction. The nonlinearity of the signal intensity has a shape like the Gauss distribution, and therefore the distribution of the two sides of the triangle is corrected by a curve having the opposite characteristic adapted for the Gauss distribution. The line 172 shortens the width p between the two sides more than normal to correct the nonlinearity of the area 160, while the line 173 lengthens the width q between the two sides more than normal to correct the nonlinearity of the area 161. By correcting the light transmission distribution in the manner described above, a one-phase signal having a linearly changing intensity can be generated.

An example of detecting the light transmitted through the moving grid according to the first embodiment was described above. The same can be said of the case in which the light reflected from the moving grid is detected. Also, apart from the example of dimension measurement described above, the invention is applicable also to other fields such as positioning.

(Second Embodiment)

A second embodiment will be described below.

The optical system of a dimension measuring apparatus according to a second embodiment includes an optical scale having two grids (two-phase grids), i.e. one moving grid and one stationary grid, a light source for irradiating the optical scale and one photodetector as basic component elements, wherein only one signal (one phase) is output from the light transmitted through the optical scale. At the same time, by setting the two-phase grids to different asymmetric light transmission distributions, an asymmetrical saw-toothed one-phase signal (hereinafter referred to as the ramp wave signal) with the transmitted light intensity changing substantially linearly with the movement of the moving grid is generated.

In the signal processing system of the dimension measuring apparatus according to the second embodiment, only the one-phase signal described above is used to detect the moving direction of the moving grid, count the integral number of grid units per pitch of the moving grid, and detect the movement start position and the stop position of the moving grid. Especially, the position of the moving grid is detected by a simple arithmetic operation with such an accuracy that the one-pitch distance of the moving grid is segmented into at least 100 small parts. Thus, even a moving distance not longer than one pitch length of the moving grid can be accurately measured.

For obtaining the aforementioned one-phase ramp wave signal, each of the two-phase grids, i.e. the moving grid and the stationary grid, is configured with binary light transmission elements of the same pitch including a white pattern capable of transmitting a large amount of light and a black pattern capable of transmitting a small amount of light. Between the moving grid and the stationary grid, however, different light transmission distributions are set by differentiating the shape of the black and white patterns in one pitch of each grid. Also in one pitch of the same grid, the shapes of the black and white pattern are differentiated to set different light transmission distributions. Further, the black and white patterns in the aforementioned light transmission distribution are set to an asymmetric shape in the direction parallel to the moving direction of the moving grid. The first light transmission distribution of the moving grid, for example, is set in such a manner that both the black and white patterns are rectangular in one pitch of each grid unit making up the moving grid and the black pattern and the white pattern have different widths. In the second light transmission distribution of the stationary grid, the black pattern is an equilateral triangle within one pitch of each grid unit making up the stationary grid, which is set to a shape with the width between the two equal sides continuously changing in the direction parallel to the moving direction of the moving grid. In the process, the stationary grid may be set to the first light transmission distribution, and the moving grid to the second light transmission distribution.

In the two-phase grids described above, the stationary grid is arranged at a position a specified distance away from the moving grid. At this position, an image having a light intensity distribution proportional to the light transmission distribution of the moving grid is obtained. Then, the light intensity distribution image of the moving grid generated on the stationary grid is masked by the black pattern of the stationary grid to detect the intensity of the light transmitted through the white pattern. In the process, the photodetector is arranged in contact with the stationary grid to detect the intensity change of the transmitted light corresponding to the geometric change of the superposition of the white patterns of the moving grid and the stationary grid while moving the moving grid. Specifically, the intensity of the transmitted light is detected non-coherently. By the way, the light transmission distribution of the stationary grid can be formed integrally on the light receiving surface of the photodetector.

With the movement of the moving grid, the light transmission distribution formed asymmetrically in the direction of movement is changed periodically. As a result, an asymmetric, saw-toothed one-phase ramp wave signal with the transmitted light intensity thereof changing substantially linearly is detected. The movement of the moving grid by one pitch changes the ramp wave signal by one cycle. Also, the ramp wave signal changes asymmetrically so that the intensity change is inverted by the inversion of the moving direction of the grid. In other words, the light transmission distribution of the moving grid and that of the stationary grid have different asymmetric configurations in order to generate a one-phase signal of such a characteristic as described above.

The ramp wave signal has an area where the intensity increases linearly and an area where the intensity linearly decreases. The width of the ascendant intensity area and the width of the descendant intensity area within one cycle of the ramp wave signal are different from each other, and the intensity changes asymmetrically in the moving direction of the grid. The width of the ascendant intensity area for the one-cycle width of the ramp wave signal is determined in accordance with the shapes of the black and white patterns of the moving grid and the stationary grid on the one hand and the ratio (duty factor) of the width of the black pattern to the length of one grid pitch on the other hand. This ramp wave signal with the transmitted light intensity thereof changing asymmetrically makes possible all the signal processing required for dimension measurement even for a one-phase signal.

The dimension measurement requires the detection of the integral pitch distance making up the moving distance equal to an integer multiple of the length of one pitch of the moving grid, the detection of the inversion of the moving direction of the moving grid, and the detection of the fraction pitch distance constituting the moving distance of a length not more than one pitch of the moving grid. The resolution of the dimension measurement depends on the detection resolution of the fraction pitch distance, and therefore it is necessary to measure the fraction pitch distance with high accuracy especially by accurately detecting the positions where the moving grid begins to move and stops. In the case under consideration, only the asymmetrically changing one-phase signal is used, and therefore all the detections described above are possible.

The ramp wave signal changes by one cycle with the movement of the moving grid by one pitch. For detecting an integer pitch distance, therefore, the number of signals is counted based on the positions of maximum intensity and minimum intensity of the ramp wave signal changing with the movement of the moving grid. In counting the ramp wave signals, it is necessary to determine the moving direction of the moving grid. Thus, the inversion of the direction of movement is detected taking advantage of the asymmetry of the intensity change of the ramp wave signal. In the process, the inversion is detected from the intensity of the ramp wave signal and the intensity of the differential signal representing the intensity difference before and after the movement of the moving grid. In accordance with the inversion of the direction of movement, the count of the number of the ramp wave signals moved is changed upward or downward thereby to detect the moving distance equal to an integer multiple of the length of one grid pitch.

The second embodiment, in which the positions where the moving grid begins to move and stops can be detected with high accuracy by simple means, is effective for measuring the moving distance of not more than the length of one pitch of the moving grid. The ramp wave signal has an ascendant intensity area and a descendant intensity area and two different positions of the same intensity. In view of this, the intensity of the position where the grid stops is in the ascendant intensity area or the descendant intensity area from the differential intensity of the ramp wave signal described above. Once the intensity area is determined, the intensity value of the ramp wave signal in the particular area corresponds to the grid position, so that the position where the grid stops is detected from the correlation between the two values.

In the case where the intensity of the ramp wave signal changes linearly within one cycle thereof, the intensity of the ramp wave signal and the grid position linearly correspond to each other, thereby making it possible to determine the position of the moving grid by a simple proportionality calculation of the signal intensity. Assuming that the intensity difference between the maximum intensity and the minimum intensity of the ramp wave signal is Vo when the moving grid has moved one pitch, the reference intensity Vo provides a reference of the length of one pitch of the moving grid. In view of this, the moving distance of not more than one pitch of the moving grid is measured by detecting the position of the moving grid from the proportionality calculation between the ramp wave signal intensity at the positions where the moving grid begins to move and stops and the reference intensity. In the case where the intensity of the ramp wave signal changes along a polygonal line but not along a uniform straight line, the proportionality calculation mentioned above is carried out for each segment of the polygonal area.

Figure 5A:
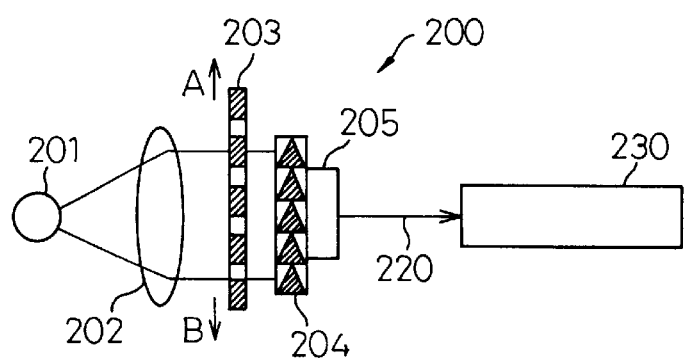
FIG. 5A is a diagram schematically showing a dimension measuring apparatus according to a second embodiment of the present invention.

The second embodiment will be explained in detail with reference to FIG. 5A. In FIG. 5A, numeral 200 designates a general configuration of the dimension measuring apparatus. The light source 201 is a LED, a white lamp or the like, and the divergent light emitted is radiated on the moving grid 203 by being collimated through the lens 202. The moving grid 203 is mounted on a probe (not shown) and moves in the directions A and B indicated by arrows. The stationary grid 204 is arranged a predetermined distance away behind the moving grid 203. One moving grid 203 and one stationary grid 204 paired with one each other are called two-phase grids.

Each of the moving grid 203 and the stationary grid 204 is composed of binary light transmitting elements including a white pattern transmitting a large amount of light and a black pattern transmitting a small amount of light. The white pattern and the black pattern of each grid unit making up the moving grid 203 and the stationary grid 204 are differently shaped and thus set to different light transmission distributions from each other. At the same time, the pattern of the stationary grid is set to an asymmetric light transmission distribution in the direction parallel to the moving direction of the moving grid 203. The use of these asymmetric, different light transmission distributions of the two-phase grids makes it possible to output an asymmetric signal, described later, and simplify the signal processing.

Figure 5B:
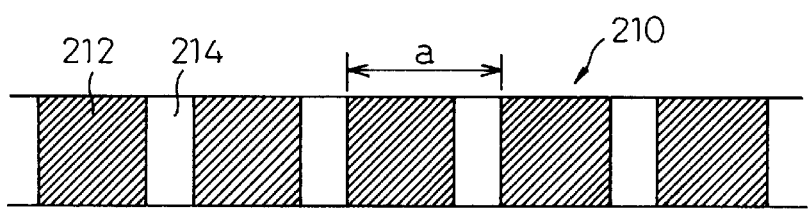
FIG. 5B is a diagram showing an example of the light transmission distribution of the moving grid in FIG. 5A.
Figure 5C:
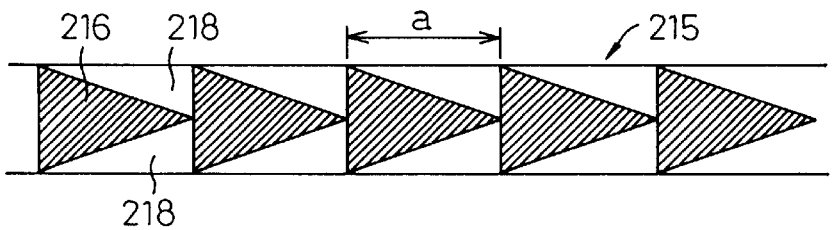
FIG. 5C is a diagram showing an example of the light transmission distribution of the stationary grids in FIG. 5A.

The light transmission distribution 210 shown in FIG. 5B is an example of the first light transmission distribution of the moving grid 203, and the light transmission distribution 215 shown in FIG. 5C is an example of the second light transmission distribution of the stationary grid 204. The black pattern 212 and the white pattern 214 making up the first light transmission distribution 210 are rectangular, as in the prior art, but are set with different widths from each other. For example, a light transmission distribution asymmetrical in the direction in which the moving grid 203 moves is set in such a manner that the width of the black pattern within one pitch of the moving grid is 80% and the width of the white pattern is 20% (duty factor of 80%) of the one pitch length a. The larger duty factor, the larger the asymmetry.

In the light transmission distribution 215, the shapes of both the white pattern and the black pattern are changed continuously at the same time along the direction parallel to the moving direction of the moving grid 203 within the one-pitch of the stationary grid 203, thereby setting a light transmission distribution asymmetrical in the direction of movement. Specifically, the black pattern 216 is set to a triangular shape in which the width between the two sides of the triangle continuously changes in the direction parallel to the direction of movement. Thus, the white patterns 218A, 218B are both triangular in shape and the particular shape changes continuously along the direction of movement. The length of one pitch of the stationary grid 204 is the same as the length a of one pitch of the movable grating 203.

Preferably, the black pattern 216 of the stationary grid 204 is a equilateral triangle and set to a light transmission distribution in which the width between the two equal sides thereof continuously changes along the moving direction of the moving grid 203. This is because the unilateral triangle maintains the symmetry of the light transmission distribution in the direction perpendicular to the moving direction of the moving grid 203. With the configuration described above, the first light transmission distribution 210 and the second light transmission distribution 215 are formed periodically over the entire grating both as light transmission distribution asymmetric in the direction parallel to the moving direction of the moving grid 203. The first light transmission distribution 210 can be used for the stationary grid 204, and the second light transmission distribution 215 for the moving grid 203.

In the two-phase grids described above, the stationary grid 204 is arranged at a position a specified distance away from the moving grid 203. This specified distance is an integer multiple of the square of the length a of each one grid pitch of the moving grid 203, divided by the average wavelength λ of the light radiated on the two-phase grids. At this position, an image having a light transmission distribution proportional to the light transmission distribution of the moving grid 203 is obtained and is known as a Fourier image. In the case where the length a of one pitch of the moving grid 203 is 10 μm and the average wavelength λ of the radiated light is 500 nm, the Fourier image distance is 200 μm. A single photodetector 205 having a single light receiving surface is arranged substantially in contact with the stationary grid 204 located at the Fourier image position.

Although an example is shown above in which the stationary grid 204 is arranged in contact with the photodetector 205 making up a separate member, the light transmission distribution of the stationary grid 204 may alternatively be integrally formed on the single light receiving surface of the photodetector 205.

In the aforementioned arrangement of the two-phase grids 203, 204 and the photodetector 205, the black pattern 216 in the second light transmission distribution 215 of the stationary grid 204 has the function of masking the white pattern portion of the Fourier image that has been transmitted through the moving grid 203, and the light in the area of the white pattern where the moving grid 203 and the stationary grid 204 are overlapped is detected. In the process, the photodetector 205, which is in contact with the stationary grid 204, detects non-coherently the intensity of the transmitted light corresponding to the geometric change of the area where the white patterns of the two-phase grids changing with the movement of the moving grid 203 are overlapped.

Figure 5D:
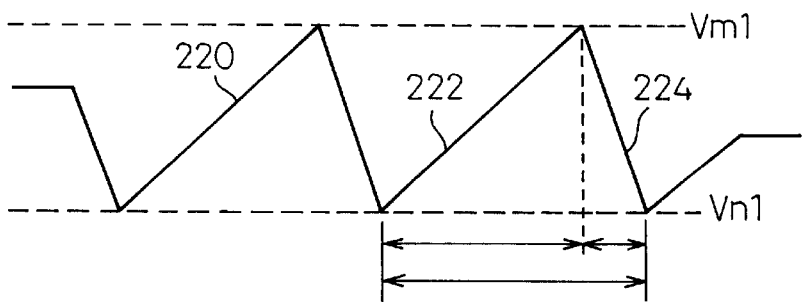
FIG. 5D is a diagram showing an example of a signal waveform in FIG. 5A.

Numeral 220 in FIG. 5D designates a single one-phase signal output from the photodetector 205. The one-phase signal 220 is a saw-toothed ramp wave signal including an area 222 where the intensity linearly increases and an area 224 where the intensity linearly decreases. It is an asymmetric signal having different widths and different intensity change rates between the ascendant intensity area 222 and the descendant intensity area 224. With every movement of the moving grid 203 by one grid pitch, the ramp wave signal changes by one cycle (width equal to the sum of the width 222 and the width 224). Assuming that the one-phase ramp wave signal 220 has a maximum intensity of Vm1 and a minimum intensity of Vn1, the intensity difference Vo1= Vm1−Vn1 provides a reference for determining the fraction pitch.

The asymmetry of the intensity change of the ramp wave signal 220 is caused by the asymmetry of the first light transmission distribution 210 of the moving grid 203 described above. Specifically, the width of the ascendant intensity area 222 and the width of the descendant intensity area 224 of the ramp wave signal 220 are determined mainly by the ratio (duty factor) of the pattern width between the black pattern 212 and the white pattern 214 of the first light transmission distribution 210, so that the smaller the width of the white pattern 214, the smaller the width of the descendant intensity area 224. This asymmetry of intensity change is effective for detecting the moving distance of not more than one pitch and the moving direction of the moving grid 203 as described later. The signal processing system 230 calculates the dimension by arithmetically processing the intensity change of the one-phase signal 220.

Figure 6A:
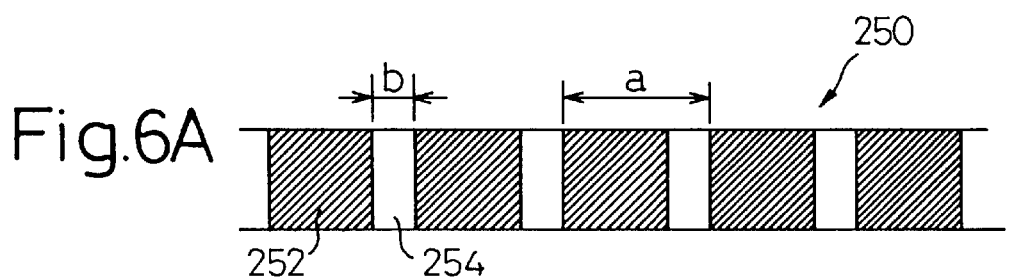
FIG. 6A is a diagram showing another light transmission distribution of the moving grid of a dimension measuring apparatus according to the second embodiment of the invention.
Figure 6B:
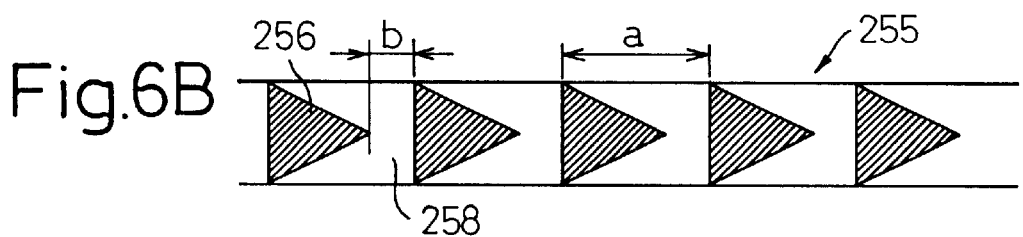
FIG. 6B is a diagram showing another light transmission distribution of the stationary grids of a dimension measuring apparatus according to the second embodiment.

FIG. 6 shows an example in which the two-phase grids 203, 204 have another light transmission distribution. The light transmission distribution 250 shown in FIG. 6A is another example of the first light transmission distribution of the moving grid 203, and the light transmission distribution 255 shown in FIG. 6B is another example of the second light transmission distribution of the stationary grid 204. Also in this case, the light transmission distribution 255 of the stationary grid 204 continuously changes along the longitudinal direction of the grid. By the way, the difference of these light transmission distributions from the example of the light transmission distribution shown in FIG. 5C lies in that the light transmission distribution 255 is such that the forward edge of the equilateral triangle of the black pattern does not reach the area of the next pitch and the length between the forward edge portion and the area of the next pitch is set to b.

Figure 6C:
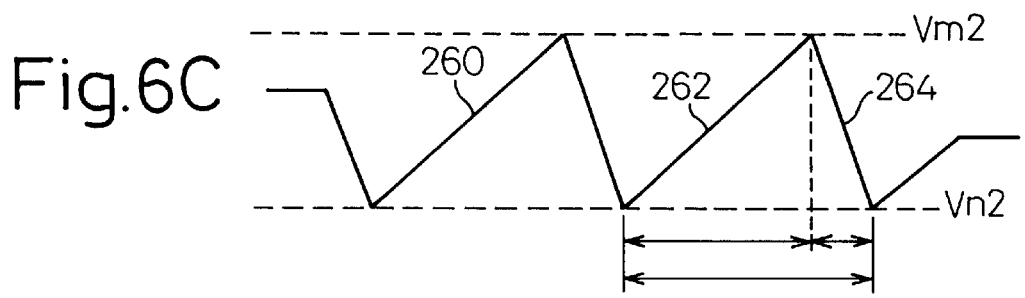
FIG. 6C is a diagram showing an example of a signal waveform using the light transmission distribution of FIGS. 6A and 6B.

Numeral 260 in FIG. 6C designates an example of a one-phase signal obtained from the photodetector using the light transmission distributions 250 and 255. The waveform of this signal is similar to that of the one-phase ramp signal 220 shown in FIG. 5D, but has a different maximum value Vm2 and a different minimum value Vn2. The width of the signal fall 264 changes with the width b in one pitch. Thus, the subsequent process can be carried out in similar manner to the case of FIGS. 5B and 5C even by using other examples of the light transmission distribution shown in FIGS. 6A and 6B.

Figure 7:
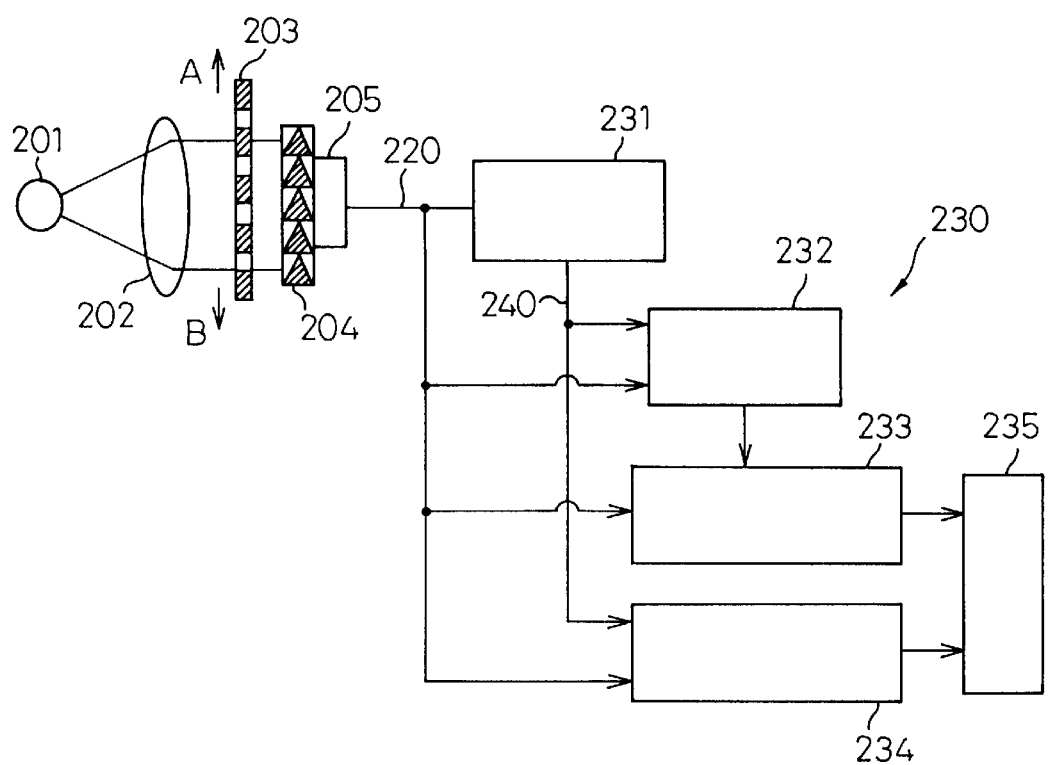
FIG. 7 is a diagram showing a signal processing system of a dimension measuring apparatus according to the second embodiment of the invention.

FIG. 7 shows an example configuration of the signal processing system 230. The signal processing system 230 includes a differential intensity detector 231, a moving direction determination unit 232, an integral pitch distance detector 233, a fraction pitch distance detector 234 and a dimension calculation unit 235. The one-phase signal 220 with the intensity thereof changing in saw-toothed form has the intensity linearly changing asymmetrically with the movement of the moving grid 203. Thus, the signal processing is simplified and the resolution of dimension measurement improved as compared with the conventional case using the two-phase sinusoidal wave signals.

Figure 8:
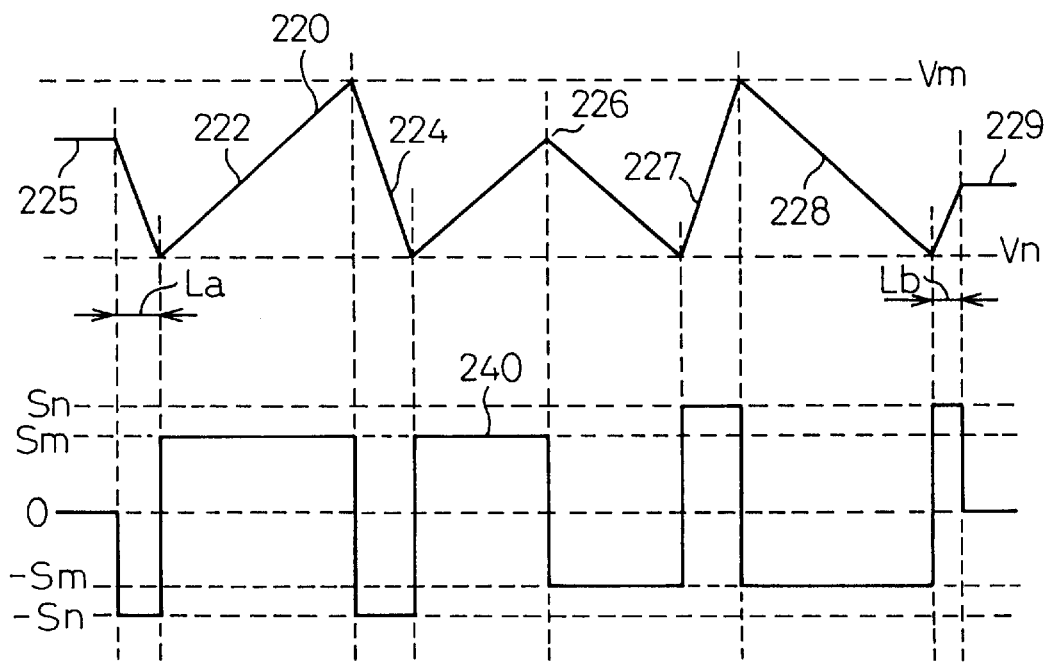
FIG. 8 is a diagram showing an example of detection of the inversion of the direction in which the grating moves in a dimension measuring apparatus according to the second embodiment of the invention.

The differential intensity detector 231 detects the intensity difference of the one-phase signal 220 before and after the movement of the moving grid 203 and outputs a difference signal 240. FIG. 8 shows an example of a waveform of the one-phase signal 220 and an example of a waveform of the difference signal 240. The differential intensity is 0 at the position 225 where the moving grid 203 begins to move, the differential intensity of the difference signal 240 is Sm in the area 222 where the intensity of the one-phase signal 220 increases, and the intensity of the difference signal 240 is −Sn in the area 224 where the intensity decreases. The ascendant intensity area 222 and the descendent intensity area 224 of the ramp wave signal 220 have different widths, and therefore the absolute value of the differential intensity is also different.

The one-phase signal 220 has two different corresponding positions for the same intensity, and therefore the grid position cannot be detected by the one-phase signal 220 alone. By using the difference signal 240, however, it can be determined whether the intensity of the one-phase signal 220 is in the ascendant area or in the descendant area, so that the intensity of the one-phase signal 220 can be related directly to the position of the moving grid 203 in each intensity area.

The moving direction determining unit 232 detects the inversion (from direction A to direction B, for example) of the direction of movement of the moving grid 203 from the intensity value of the one-phase signal 220 and the differential signal 240. If the moving direction of the moving grid 203 is inverted at the position 226 of FIG. 8, the change of the intensity of the one-phase signal 220 before the inversion is inverted in the opposite direction symmetrically. Specifically, the movement with the intensity Sm of the differential signal 240 is inverted to the movement with the differential intensity −Sm.

In the case where the movement continues in the same direction without inverting the direction of movement at the position 226, the value of the differential intensity in the next descendent intensity area is −Sn. Thus, the inversion of the direction of movement can be detected by comparing the differential intensity values −Sm and −Sn with each other and the signal width over which the particular differential intensity is sustained. Once the direction of movement is inverted, the values of the differential intensity for the ascendant intensity area 227 and the descendent intensity area 228 after inversion are given as Sn and −Sm, respectively.

The integral pitch distance detector 233 detects the number n of movements equal to an integer multiple of the pitch of the moving grid 203 and thus calculates the moving distance na equal to an integer multiple of the length a of one grid pitch. For example, the position where the intensity of the one-phase signal 220 changes from maximum value to minimum value is assumed to be a reference position for counting the number of signals, and the count is changed upward or downward by the movement of one grid pitch. The increment or decrement of the count is made in accordance with the moving direction of the moving grid 203.

One of the features of a method using the one-phase signal 220 is that the moving distance of not more than the length a of one pitch of the moving grid 203 is accurately detected. The fraction pitch distance detector 234 detects the positions of moving grid 203 including the movement start position 225 and the stop position 229 after movement and detects the moving distance La and Lb not more than the length a of one grid pitch. In this detection process, the grating position is detected directly from the one-phase signal 220 at the movement start position 225 and the stop position 229 of the moving grid 203 and the difference signal 240. The dimension calculation unit 235 calculates the dimension by measuring the moving distance of the probe based on the sum of the moving distance equal to an integer multiple of one grid pitch detected by the integral pitch distance detector 233 and the moving distance of not more than one grid pitch detected by the fraction pitch distance detector 234.

Figure 9A:
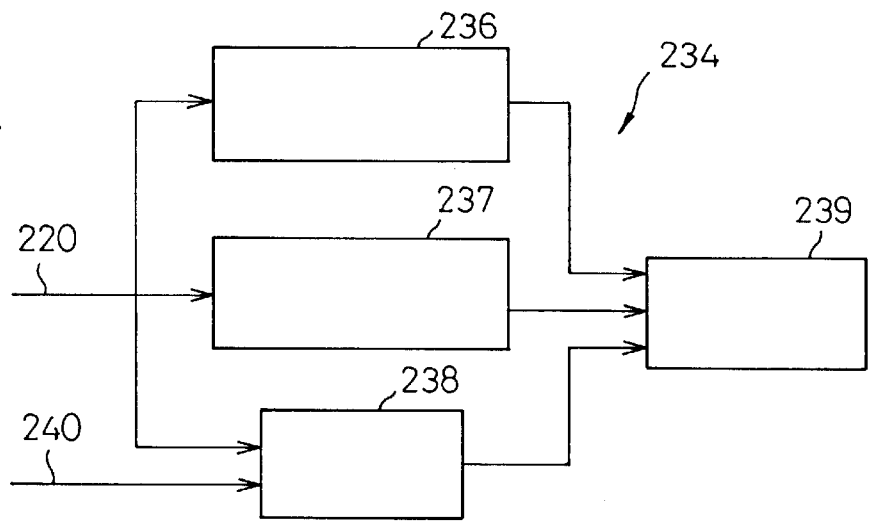
FIG. 9A is a diagram showing a fraction pitch detector of a dimension measuring apparatus according to the second embodiment of the invention.
Figure 9B:
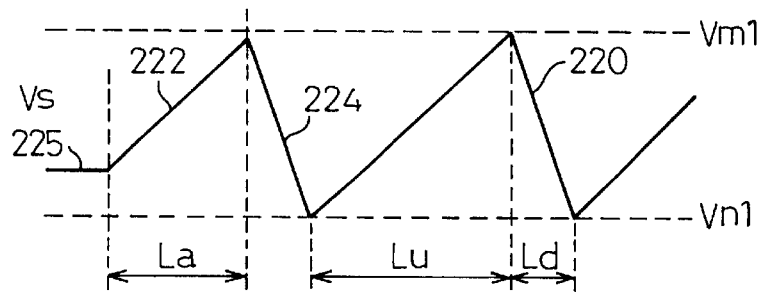
FIG. 9B is a diagram showing an example of a signal waveform of a dimension measuring apparatus according to the second embodiment.

FIG. 9A shows a specific example of a configuration of the fraction pitch distance detector 234, and FIG. 9B an example of a waveform of the one-phase signal 220. The stop position intensity storage unit 236 detects and stores the intensity of the one-phase signal 220 when the moving grid 203 stops moving and is stationary. The intensity of the one-phase signal 220 changes with the grid stop position. The maximum/minimum intensity storage unit 237 detects and stores the maximum intensity Vm and the minimum intensity Vn of the one-phase signal 220 for the time length of several periods in the neighborhood of the movement start position and the stop position of the grid. The intensity area determining unit 238 determines whether the intensity of the movement start position and the stop position of the grid is located in the ascendant area 222 or the descendant area 224 based on the one-phase signal 220 and the difference signal 240. The grid position correlating circuit 239 stores or calculates the correlation between the intensity of the one-phase signal 220 and the grid position, and thus by determining the grid stop position, calculates the moving distance not more than length of one grid pitch.

The one-phase signal of FIG. 9B indicates that the intensity is Vs for the movement start position 225 of the moving grid 203. Assuming that the intensity difference Vo1=Vm1−Vn1 between the maximum intensity Vm1 and the minimum intensity Vn1 of the one-phase signal 220 is used as a reference intensity, the reference intensity Vo1 for one period of the one-phase signal 220 constitutes a reference of the length a of one pitch of the moving grid 203. The sum of the signal width Lu in the ascendant intensity area and the signal width Ld in the descendant intensity area of the one-phase signal 220 corresponds to one pitch length a. In this case, the signal duty factor d constituting the ratio of the signal width Lu to the width of one period Lp is given as d=Lu/Lp.

In the case where the intensity of the one-phase signal 220 changes linearly over the entire area, the signal intensity and the grid position directly correspond to each other and are proportional to each other. The grid position correlating unit 239 detects the moving distance of not more than one pitch of the moving grid 203 from the proportional relation between the intensity difference Vp=Vs−Vn1 between the intensity Vs at the detected grid stop position and the minimum intensity. In the case where the grid stop position is located in the ascendant intensity area 225 in the drawing, the distance La between the movement start position and the maximum intensity position of the one-phase signal is given as advp/Vo1. In the case where the movement start position is located in the descendant intensity area and the intensity difference is the same Vp as described above, La is given as a(1−d)Vp/Vo1. Thus, the moving distance of not more than the length of one grid pitch can be determined by a simple proportionality calculation. Also for the stop position 229 of the moving grid 203, the moving distance of not more than one pitch length can be calculated similarly.

The aforementioned proportionality calculation is effective in the case where the intensity in each of the ascendant intensity area and the descendant intensity area of the one-phase signal 220 uniformly changes linearly. Even in the case where the intensity changes polygonally instead of uniformly in the aforementioned areas, the same effect can be obtained by storing the individual linear segments of the polygon in the grating position correlating unit 239 and carrying out the aforementioned proportionality calculation for each segment. In this way, the advantage is that the one-phase signal 220 obtained is such that the signal intensity and the grid position are proportional to each other and the grid position can be detected by the aforementioned simple proportionality equation. In the case where the intensity of the one-phase signal 220 is detected with the resolution of 8 bits, for example, the grid position can be detected with an accuracy of one period of the ramp wave signal segmented into about 200 parts. Thus, the object of measuring the dimension with the resolution of one pitch of the moving grid 203 segmented into 100 parts can be sufficiently achieved.

Although an example of detecting the light transmitted through the two-phase grids has been explained above, a modification is also applicable in which one or both of the two-phase grids are of such a type as to reflect the light and the light reflected from the grid is detected. As another alternative, it is possible to employ a configuration in which the moving grid 203 is fixed while the stationary grid 204 is moved. Apart from the example of dimension measurement explained above, the invention is applicable also to other fields such as positioning.

(Third Embodiment)

A third embodiment will be explained below.

In the case where the intensity change of the one-phase signal deviates from the straight line and changes along a nonlinear curve, the position of the moving grid cannot be determined by the simple proportionality calculation of the ramp wave signal intensity. In such a case, the temporally continuous one-phase signal is converted into a temporally digitized one-phase signal corresponding to the sampling frequency for A/D conversion and the number of the digitized signals is detected. In view of the fact that one pitch length of the moving grid and the sampling frequency are constant, the number of digitized signals contains the information on the moving distance of the moving grid so that the number of digitized signals for the movement of the moving grid by one pitch provides a reference length.

For detecting the fraction pitch distance not more than the length of one pitch of the moving grid in the aforementioned case, two types of the number of signals are detected. One is the first number P1 of the digitized signals when the moving grid has moved over the distance not more than one pitch of the moving grid from the movement start position to the reference position of the digitized signal, and the other is the second number P2 of the digitized signals when the moving grid has moved one pitch immediately after starting to move. In the process, the product of the signal number ratio P1/P2 and the length a of one grid pitch is calculated thereby to detect the moving distance of not more than one grid pitch. The same applies to the stop position of the moving grid.

Figure 10:
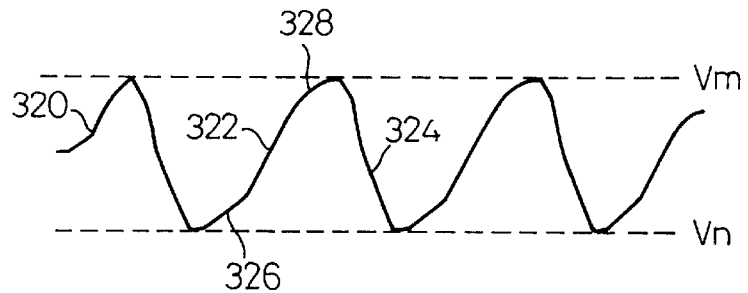
FIG. 10 is a diagram showing an example of a waveform of a one-phase signal of a dimension measuring apparatus according to a third embodiment of the invention.

According to the second embodiment, the stop position of the grid was detected by the linearity calculation in the case where the one-phase signal 220 is a linearly changing ramp wave signal. In the embodiment under consideration, however, an example of the waveform of the one-phase signal 320 with a nonlinearly changing intensity is shown in FIG. 10. The one-phase signal 320 exhibits a considerable nonlinearity in the neighborhood of a low intensity area 326 and a high intensity area 328 of the ascendant intensity area 322 and the descendant intensity area 324. In the case where the signal intensity changes nonlinearly, the relation between the signal intensity and the position of the moving grid is also nonlinear, thereby complicating the data processing for detecting the grid position. In such a case, not the intensity of the one-phase signal 320 but the number of signals obtained by sampling the one-phase signal 320 is used as an object of detection.

Figure 11A:
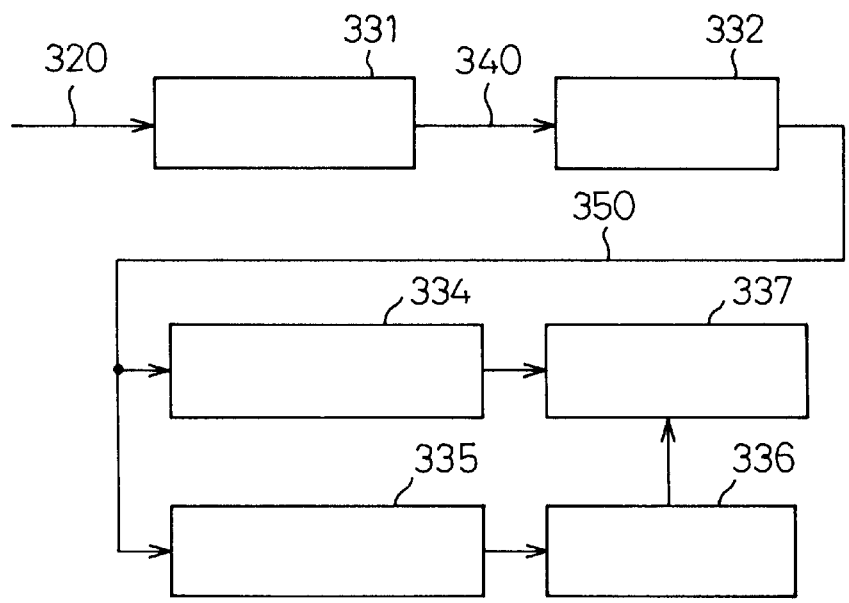
FIG. 11A is a diagram showing a signal processing system of a dimension measuring apparatus according to the third embodiment of the invention.

FIG. 11A shows an example of a configuration of the fraction pitch distance calculation unit of the signal processing system of the dimension measuring apparatus according to the third embodiment. The optical system and the configuration the other parts of the dimension measuring apparatus according to the third embodiment are similar to the corresponding parts of the second embodiment and therefore will be described below. Also it is assumed that the one-phase signal 320 is output from the photodetector 205 of the optical system shown in FIG. 5A.

Figure 11B:
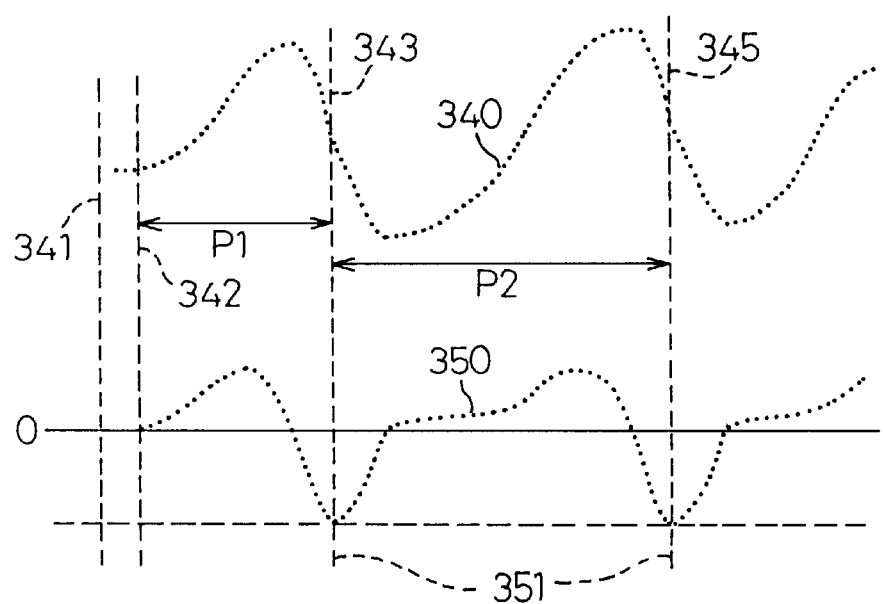
FIG. 11B is a diagram showing an example of a signal waveform in FIG. 11A.

In FIG. 11A, a sampling signal detector 331 samples the temporally continuously changing one-phase signal 320 by an A/D converter or the like at a predetermined frequency and outputs a temporally discrete digitized signal 340. FIG. 11B shows an example of a waveform of the digitized signal 340 and a digitization difference signal 350. In the case where the length of one pitch of the moving grid is 10 μm, for example, assume that the grid stop position is detected with an accuracy of one pitch of the moving grid segmented into 100 parts, while moving the probe at the rate of 1 m/sec. A sampling frequency of at least 10 MHz is required.

The digitization difference signal detector 332 detects the digitization difference signal 350 by calculating the intensity difference of the digitized signal 340 before and after the movement of the moving grid 203. This digitization difference signal 350 is used to detect the movement start position of the moving grid 203, the stop position thereof and the position 351 associated with the peak difference intensity of the digitization difference signal 350. The digitization difference signal 350 indicates the state in which the moving grid 203 is stationary from the positions 341 to 342 and begins to move from the position 342. The positions 343 and 345 are where the absolute value of the intensity of the digitization difference signal 350 assumes a maximum value, and constitute reference positions for detecting the number of sampling signals. The distance between the positions 343 and 345 corresponds to the length of one pitch of the moving grid 203.

The first moved pulse number detector 334 detects and stores the number P1 of the digitized signals 340 from the movement start position 342 of the moving grid 203 to the reference position 343. The number P1 is called the first number of the moved pulses. The intensity of the digitization difference signal 350 from the movement start position 341 of the moving grid to the position 342 is b andtherefore it is determined that the moving grid 203 is stationary. Once the moving grid 203 starts to move, the digitization difference signal 350 assumes a value other than 0 and therefore it is determined that the movement has started.

The second moved pulse number detector 335 detects the number P2 of the digitized signals 340 during the movement of the moving grid 203 by one pitch between the reference positions 343 and 345. The number P2 is called the second number of the moved pulses. In the case where the moving speed of the moving grid 203 is constant, the number P2 of the signals provides a reference length of one grid pitch. In the case where the moving speed of the moving grid 203 is not constant, on the other hand, the number P2 of the signals is not constant but changes with the travel speed. In such a case, the second number of the moved pulses is detected for the time length of several periods after movement is started, and the change in the second number of the moved pulses is calculated at the reference moved pulse number estimation unit 336, thereby calculating the second number P0 of the moved pulses upon movement of the moving grid over one grid pitch length immediate after starting the movement. This estimated number P0 of the signals provides a reference length of one pitch of the moving grid 203.

The fraction pitch distance calculation unit 337 is for detecting the moving distance not more than the length of one pitch of the moving grid. This unit 337 calculates the product aP1/P0 of the ratio between the first number P1 of the pulses moved the distance of not more than one grid pitch and the reference number P0 of the pulses covering the distance of one grid pitch and the length a of one pitch of the moving grid thereby to calculate the fraction pitch distance from the movement starting position 342 of the moving grid 203 to the reference position 343. This also applies to the stop position of the moving grid 203. The aforementioned embodiment refers to the case in which the fraction pitch distance is measured only with the digitization difference signal 350. Alternatively, the fraction pitch distance can be detected by use of the information including the position where the differential intensity between the intensity value of the digitized signal 340 and the digitization difference signal 350 assumes a maximum value.

Although the embodiment described above refers to the case where only the fraction pitch distance is calculated by the digitization difference signal 350 detected by sampling, the simultaneous use of the digitized signal 340 makes it possible to detect the inversion of the direction in which the moving grid 203 moves and the integral pitch distance. Also, the digitized signal 340 can be combined with the temporally continuous one-phase signal 220 shown in FIG. 5D.

Apart from the foregoing description referring to the case of dimension measurement, the invention is also applicable to other fields such as the positioning operation.

(Fourth Embodiment)

A fourth embodiment will be explained below.

The optical system of a dimension measuring apparatus according to a fourth embodiment includes an optical scale having two grids (two-phase grids), i.e. one moving grid and one stationary grid, a light source such as a LED for irradiating the optical scale and one photodetector as basic component elements for outputting one signal (one phase) from the light transmitted through the optical scale. Each of the two-phase grids is configured with binary light transmission elements including a white pattern transmitting a large amount of light and a black pattern transmitting a small amount of light. The moving grid and the stationary grid are set to different light transmission distributions and different grid pitch lengths thereby to generate a one-phase signal with the transmitted light intensity changing substantially linearly with the movement of the moving grid.

Take as an example a configuration in which the moving grid arranged behind the light source is irradiated and the stationary grid is arranged behind the moving grid so that the intensity of the light transmitted through the moving grid and the stationary grid is detected. In this case, assume that the length of one grid pitch of the moving grid is p times (p: integer not less than 2) as large as the length of one grid pitch of the stationary grid, and that the width and shape of the white pattern and the black pattern of the moving grid and the stationary grid are differentiated from each other. With the movement of the moving grid, a one-phase signal is generated in which the transmitted light intensity (contrast) changes by one cycle for each cycle of the grid pitch of the stationary grid. Specifically, the system is so configured that when the moving grid has moved the length of one pitch, a one-phase of p cycle signal is generated. For this purpose, the width and shape of the black pattern and the white pattern of the moving grid and the stationary grid are set in a specified relation.

In the case where the light irradiating the two-phase grids is a plane wave, the stationary grid is arranged at a specified distance (Fourier image distance) proportional to the square of the length of one pitch of the moving grid divided by the wavelength of the light source. It is necessary that an image (shadow) of the intensity distribution similar to the light transmission distribution of the moving grid can be obtained at a position where the stationary grid is arranged. For this reason, the length of one pitch of the moving grid is set to at least twice the length of one pitch of the stationary grid to reduce the diffractive expansion due to the opening of the moving grid. By reducing the diffractive expansion, the boundary (edge) between the white pattern and the black pattern of the moving grid is sharpened, with the result that an image of the transmitted light distribution similar to the geometric shape of the moving grid is formed at the Fourier image position.

In view of this, the image of the moving grid generated at the position of the stationary grid is masked by the black pattern of the stationary grid, and the transmitted light intensity is detected from the overlapped area of the white patterns of the moving grid and the stationary grid. Since the length of one pitch of the moving grid is long (the diffractive expansion is small), the transmitted light distribution from the two-phase grids is substantially equivalent to the geometrically overlapped shape of the white patterns of the two-phase grids, and therefore the area can be widened where the transmitted light intensity changes linearly. The transmitted light is detected by bringing the photodetector substantially into contact with the stationary grid to improve the S/N ratio of the transmitted light intensity. As an alternative, the transmitted light intensity may be detected by a photodetector including a photodetector having the light receiving surface formed integrally with the pattern of the stationary grid.

In the case where the divergent light is radiated on the moving grid, the light phase is varied from one place to another of the moving grid irradiated, thereby making it impossible to form the image of the moving grid having a satisfactory S/N ratio at the Fourier image position. In such a case, the stationary grid is required to be arranged at a position almost immediately behind the moving grid. By making the one pitch of the moving grid longer, the diffractive expansion is reduced even for the divergent light and therefore the distance is lengthened for storing the light transmission distribution corresponding to the geometric shape of the moving grid as viewed from the position of the moving grid. As a result, the width of the gap between the moving grid and the stationary grid can be widened to some degree so that the smooth movement of the moving grid can be guaranteed even in the case where the stationary grid is arranged in proximity to the moving grid.

The white pattern and the black pattern of individual grid units making up the moving grid are both rectangular. However, the width and shape of the white pattern and the black pattern are different within one grid pitch, and the moving grid is set to a light transmission distribution asymmetric in the moving direction of the grid. Each grid unit making up the stationary grid, on the other hand, is such that the white pattern and the black pattern are not rectangular and have different widths and shapes within one grid pitch. Thus, the stationary grid is set to a light transmission distribution asymmetric in the moving direction of the moving grid. For example, in a partial section within one grid pitch of the stationary grid, the black pattern is formed as triangle, the white pattern is formed as a trapezoid and the oblique line of the triangle is formed in the direction parallel to the moving direction of the moving grid. At the same time, the width of the black pattern of the moving grid is set to a length equal to the sum of an integer multiple of one grid pitch of the stationary grid and the width of the black pattern of the stationary grid.

By setting the shape of the moving grid and the stationary grid in this way, the diffractive expansion due to the rectangular opening of the moving grid is reduced, so that the light transmission distribution substantially equivalent to the geometric shape of the moving grid is formed at the Fourier image position. Once the moving grid is moved, the light transmission distribution formed asymmetrically is changed periodically, and an asymmetric saw-toothed one-phase signal having a transmitted light intensity changing substantially linearly is detected. Even in the case where one grid pitch of the moving grid is long, the intensity (contrast) of the one-phase signal changes by one cycle for each one pitch of the stationary grid when the moving grid moves the length of one pitch of the stationary grid. This one-phase signal is such that in the case where the direction in which the moving grid changes is inverted, the direction in which the transmitted light intensity changes is also inverted due to the asymmetry of the grid shape. For generating a one-phase signal of this characteristic, the moving grid and the stationary grid are set to different asymmetric light transmission distributions.

In the example described above, the moving grid is arranged behind the light source and the stationary grid is arranged behind the moving grid, and the transmitted light is detected with the moving grid which has the lengthened grid pitch. In the case of a configuration in which the stationary grid is arranged behind the light source and the moving grid is arranged behind the stationary grid, on the other hand, the grid pitch length of the stationary grid is lengthened as compared with the pitch length of the moving grid. In this way, the effect of the diffractive expansion can be reduced by lengthening the pitch length of the grid arranged nearer to the light source as compared with one pitch of the other grating.

The saw-toothed wave signal has an area where the intensity linearly increases and an area where the intensity decreases linearly. In the case where the one-phase signal is asymmetric, the width of the ascendant intensity area and the width of the descendant intensity area are different from each other in one period of the signal, so that the intensity changes asymmetrically in the moving direction of the moving grid. The ratio of the width between the ascendant intensity area and the descendant intensity area for one period width of an asymmetric signal is determined by the shape and the ratio of width between the black pattern and the white pattern of the moving grid and the stationary grid. In the case of an asymmetric one-phase signal, the moving direction of the moving grid can be detected from the intensity change of the one-phase signal itself, and therefore the measurement can be effectively carried out taking the direction of movement into consideration.

Normally, the dimension measuring apparatus measures the dimension by the distance moved by the moving grid from the time when it starts moving from the stationary state to the time when it stops. For improving the accuracy of the dimension measurement, it is important to accurately measure the position where the moving grid starts moving and the position where it stops. For accurately detecting these grid positions, one cycle of the one-phase signal is finely segmented into at least 100 parts. Also, by detecting the change in the moving speed of the moving grid, the inversion of the direction in which the moving grid moves can be steadily detected.

When detecting the grid position by finely segmenting one period of the one-phase signal, three types of data are used including the intensity of the one-phase signal, the differential intensity providing the intensity difference of the one-phase signal before and after movement of the moving grid and the number of digitized signals temporally digitized from the one-phase signal. The one-phase signal has an ascendant intensity area and a descendant intensity area, and two different positions correspond to the same intensity. In view of this, it is determined from the differential intensity whether the grid position is in the ascendant intensity area or the descendant intensity area. Once the intensity area is determined, the grid position is detected from the correlation between the intensity value of the one-phase signal and the number of digitized signals in the particular area.

In the case where the intensity of the one-phase signal changes linearly within one period, the intensity value of the one-phase signal and the grid position linearly correspond to each other, and the grid position can be determined by a simple proportionality calculation of the intensity value. In the one-phase signal actually detected, however, the transmitted light intensity changes nonlinearly under the effect of the diffractive expansion. In such a case, the one-phase signal detected as a temporally continuous signal is converted into a one-phase signal temporally digitized by sampling the first one-phase signal, and the number of digitized signals is detected for each period of the resulting one-phase signal. In view of the fact that the length of one pitch of the stationary grid and the sampling frequency are constant, the number of the digitized signals changes with the grid position and the moving speed of the moving grid. In the process, the number of the digitized signals involved in the movement of the moving grid for the length of one pitch of the stationary grid makes up a reference length of one grid pitch under the speed conditions for the movement of the moving grid.

In the case where the moving speed of the moving grid is constant, the grid position can be determined from the ratio between the number of digitized signals for one period of the one-phase signal and the number of digitized signals detected during the time length of movement from the reference position to a specified position. Even in the case where the one-phase signal is nonlinear, therefore, the grid position can be determined by simple means without using the reference table for the grid position. In the case where the moving speed of the moving grid is not constant, on the other hand, both the intensity of the one-phase signal for one reference period and the number of digitized signals are detected and stored as reference data. Both the intensity of the one-phase signal and the number of digitized signals obtained during a specified time length are compared with reference data, and the number of digitized signals detected during a specified section is corrected thereby to detect the grid position.

In the case where the direction in which the probe moves is inverted in the area where the intensity of the one-phase signal changes broadly, the position of inversion is detected from the change in the moving speed of the moving grid. The change in moving speed can be detected as a change of the number of digitized signals. Assume, for example, that the probe, which has risen from the starting position and reached a highest point, changes direction to downward. The moving speed decreases while rising and becomes zero at the highest point. In view of this, from the change of the number of digitized signals per unit time, the position where the speed changes from upward to downward is detected thereby to detect the position of inversion.

Figure 12A:
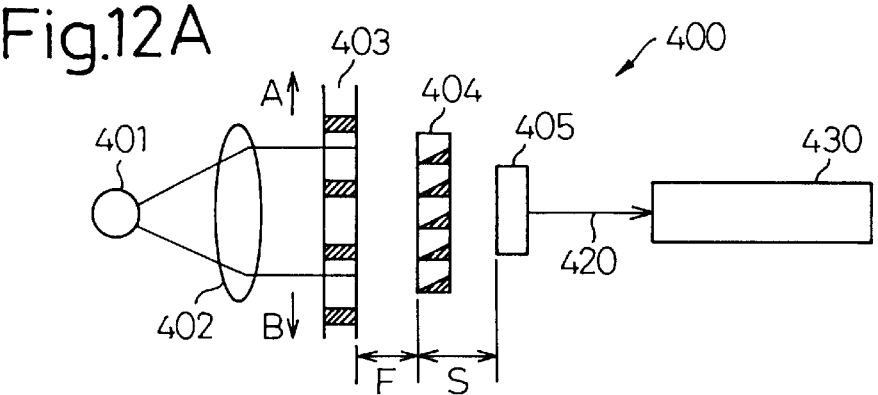
FIG. 12A is a diagram schematically showing a dimension measuring apparatus according to a fourth embodiment of the present invention.

The fourth embodiment will be explained in detail with reference to FIG. 12. In FIG. 12A, numeral 400 designates a general configuration of a dimension measuring apparatus. A light source 401 designates a LED or the like. The divergent light emitted from the light source 401 is collimated through a lens 402 and radiated on a moving grid 403. In the case where a very parallel light is emitted from the light source 401 or the divergent light is radiated directly on the moving grid 403, the lens 402 is not required. The moving grid 403 is mounted on a probe (not shown) and moves in the directions A and B indicated by arrows. The stationary grid 404 is arranged a predetermined distance F behind the moving grid 403. The pair of one moving grid 403 and one stationary grid 404 is called a pair of two-phase grids.

Each of the moving grid 403 and the stationary grid 404 is configured with binary light transmission elements including a white pattern transmitting a large amount of light and a black pattern transmitting a small amount of light. In the process, the individual grid units making up the moving grid 403 and the stationary grid 404 have different lengths of one grid pitch, and the white pattern and the black pattern are set to different shapes. In a configuration with the moving grid 403 arranged at a position near to the light source 401, the length of one pitch of the moving grid 403 is set to an integer multiple of, or at least twice the length of, one grid pitch of the stationary grid 404. In a configuration with the stationary grid 404 arranged at a position near to the light source 401, on the other hand, the length of one pitch of the stationary grid 404 is set to an integer multiple of, or at least twice the length of one grid pitch of, the moving grid 403. In this way, the length of one pitch of the grid placed behind the light source 401 is lengthened. Further, the individual grid units making up the moving grid 403 and the stationary grid 404 are set to a light transmission distribution asymmetrical in the moving direction of the moving grid 403.

Figure 12B:
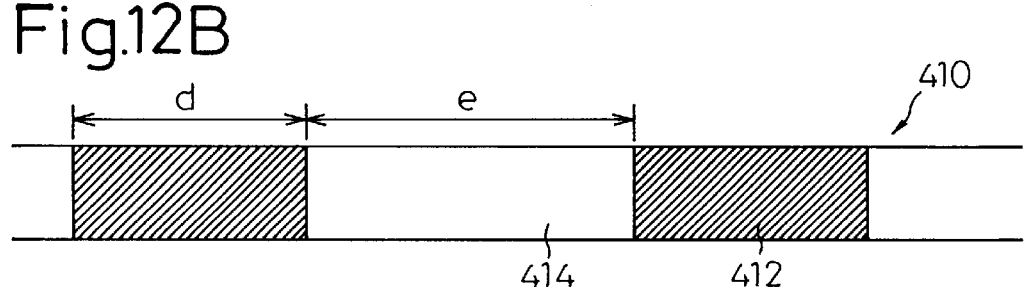
FIG. 12B is a diagram showing an example of the light transmission distribution of the moving grid in FIG. 12A.
Figure 12C:
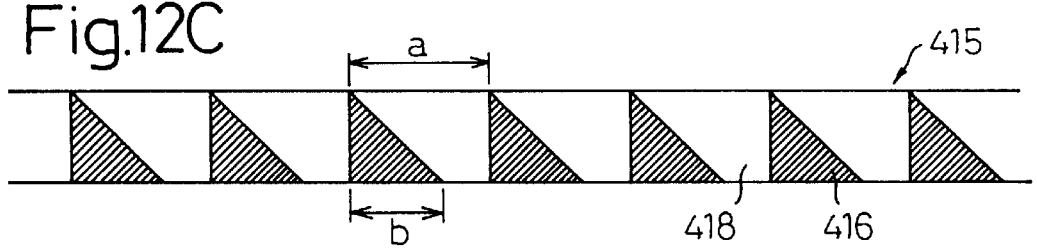
FIG. 12C is a diagram showing an example of the light transmission distribution of the stationary grids in FIG. 12A.

An example of the light transmission distribution of the moving grid 403 is shown by numeral 410 in FIG. 12B, and an example of the light transmission distribution of the stationary grid 404 is designated by 415 in FIG. 12C. The light transmission distribution 410 is that of the moving grid 403, and the light transmission distribution 415 is that of the stationary grid 404. The black pattern 416 and the white pattern 418 in one grid pitch of the stationary grid 404 are both non-rectangular and have different shapes and widths. The black pattern 416 is configured in such a manner that the shape thereof changes in the direction parallel to the moving direction of the moving grid 403. This is also the case with the white pattern 418. Specifically, the black pattern 416 assumes a triangular shape in a partial section of one grid pitch with the oblique line of the triangle continuously changing in the direction parallel to the direction of movement. The white pattern 418, on the other hand, assumes a trapezoidal shape. The length of one grid pitch of the stationary grid 404 is assumed to be a, and the width of the black pattern is assumed to be b. For example, the width a is set to about 10 $\mu$m, and the width b is set to about 7 $\mu$m.

The black pattern 412 and the white pattern 414 of the moving grid 403 are rectangular in shape, and the width d of the black pattern and the width e of the white pattern are set to different values. Thus, the moving grid 403 and the stationary grid 404 both have light transmission distributions asymmetrical in the moving direction of the moving grid 403.

In the aforementioned shape of the gratings, the width d of the black pattern 412 of the moving grid 403 is set to (n−1)a+b, where n is a positive integer (n$\geq$1). The width e of the white pattern 414 of the moving grid 403, on the other hand, is set to ma+(a−b), where m is a positive integer (m$\geq$1). As a result, the width of the black pattern 412 and the width of the white pattern 414 of the moving grid 403 are different from each other. When p is assumed to be a positive integer (p$\geq$2), the length of one grid pitch of the moving grid 403 is pa. In FIG. 12B, numeral 410 designates an example in which n=2, m=2 and p=4. When a=10 $\mu$m, for example, the length of one grid pitch of the moving grid 403 is given as 40 $\mu$m. In the case under consideration, it is important to add the width of the black pattern 416 of the stationary grid 404 as an extra to the width of the black pattern 412 of the moving grid 403.

In the two-phase grids mentioned above, the stationary grid 404 is arranged a specified distance away from the moving grid 403. This distance is assumed to be the Fourier image distance F. The Fourier image distance F equals the square of the length of one grid pitch of the moving grid 403 divided by the average wavelength $\lambda$ of the light radiated on the two-phase grids and multiplied by an integer. Assume, for example, that the length of one grid pitch of the moving grid 403 is 40 μm and the average wavelength λ of the light from the light source 401 is 500 nm. The Fourier image distance F is 3200 μm. As compared with the conventional case where the length of one grid pitch of the moving grid is a narrow 10 μm, the gap between the moving grid and the stationary grid is considerably widened. Even in the case where the gap is displaced by about several hundreds of μm, therefore, the detection of the intensity of the light transmitted through the two-phase grids is not substantially affected. In other words, the clearance of the gap setting can be enlarged, and the position of the stationary grid 404 can be set roughly.

Further, the diffractive expansion of the light transmitted through the moving grid 403 can be reduced by lengthening the length of one grid pitch of the moving grid 403 as compared with the length of one grid pitch of the stationary grid 404 while at the same time lengthening the opening width of the white pattern 414 of the light transmission distribution 410 of the moving grid 403. Generally, the angle of the diffractive expansion is inversely proportional to the opening width (width of the white pattern 414) of the moving grid 403. If the opening width is increased to a quadruple of the width of the conventional one, therefore, the width of the diffractive expansion is reduced to one fifth. As a result, a light intensity distribution substantially equivalent to the geometric shape of the moving grid 403 is obtained at the Fourier image position.

The light transmitted through the moving grid 403 and the stationary grid 404 is preferably detected by the photodetector 405 under the condition that the photodetector 405 is brought into contact with the stationary grid 404 to such an extent that the gap distance S between the stationary grid 404 and the photodetector 405 is substantially zero. By reducing S to 0, the S/N ratio of the one-phase signal described later can be improved. Alternatively, without separating the stationary grid 404 and the photodetector 405 from each other, the black pattern 416 and the white pattern 418 may be directly (integrally) formed on the light receiving surface of the photodetector 405.

The detection of the transmitted light intensity described above is associated with the case in which the light radiated on the moving grid 403 is parallel rays and the stationary grid 404 is arranged at the Fourier image position of the moving grid 403. In the case where the divergent light is radiated on the moving grid 403, the transmitted light can be detected by arranging the stationary grid 404 at a position almost immediately after the moving grid 403, say, about 50 μm behind the moving grid 403 and bringing the stationary grid 404 into contact with the photodetector 405 as described above. In this case, too, by increasing the opening of the moving grid 403, the distance is lengthened for which the intensity distribution of the light transmitted through the moving grid 403 maintains a geometrically equivalent distribution. In this way, when arranging the stationary grid 404 behind the moving grid 403, a gap of, say, 50 μm sufficient for smooth movement of the moving grid 403 can be secured.

In the case where the intensity of the transmitted light from the two-phase grids 403 and 404 having the shape shown in FIGS. 12B and 12C is detected, the diffractive expansion due to the opening of the moving grid 403 is reduced, and therefore the detected transmitted light intensity is substantially equivalent to the geometric overlap of the two white patterns of the moving grid 403 and the stationary grid 404. In the process, each time the moving grid 403 covers the distance of one grid pitch of the stationary grid 404, the contrast of the transmitted light changes by one cycle in accordance with the light transmission distribution 415 in one grid pitch of the stationary grid 404. As described above, p=4 in this case. By moving the moving grid 403 over the distance equal to one cycle thereof, therefore, the light intensity change for four cycles of the stationary grid 404 is obtained. As a result, by setting the light transmission distribution of the two-phase grids 403 and 404 and the length of one pitch to the specific relation described above, it is possible to detect the light intensity substantially linearly changing in accordance with the grid cycle of the stationary grid 404 having a short pitch even in the case where the length of one pitch of the moving grid 403 is long. Also, since the light transmission distribution of the moving grid 403 and the stationary grid 404 are both set to an asymmetrical form, the transmitted light intensity also undergoes an asymmetric change. Incidentally, the light from the light source 401 is assumed to be radiated on a plurality of grid units of the moving grid 403 at the same time as shown.

Figure 12D:
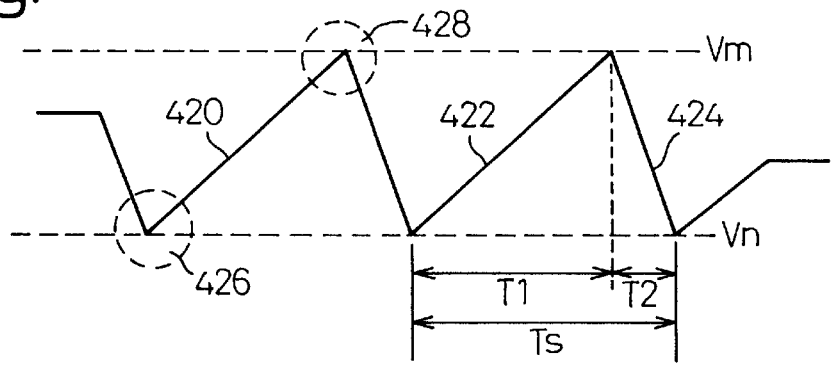
FIG. 12D is a diagram showing an example of a signal waveform in FIG. 12A.

An example of the waveform of the one-phase signal 420 output from the photodetector 405 is shown in FIG. 12D. Since the diffractive expansion of the moving grid 403 is small, the intensity of the one-phase signal 420 changes substantially linearly. The example of the waveform of the one-phase signal 420 shown in FIG. 12D is an example waveform in an ideal state not affected by the diffraction. This example of the waveform represents an asymmetric saw-toothed wave signal having an area 422 where the intensity linearly increases and an area 424 where the intensity linearly decreases and in which the width T1 of the ascendant intensity area 422 and the width T2 of the descendant intensity area 424 are different from each other with a different intensity change rate. One cycle Ts of the one-phase signal 420 corresponds to the length of one grid pitch of the stationary grid 404, and the signal 420 changes by one cycle each time the distance equal to one grid pitch of the stationary grid 404 is moved by the moving grid 403. This asymmetry of the intensity change is effective for detection of the moving direction of the moving grid 403. The signal processing system 430 calculates the moving direction of the moving grid 403 and the distance moved by the moving grid 403 from the intensity change, etc. of the one-phase signal 420.

The asymmetry of the intensity change of the one-phase signal 420 is attributable to the asymmetry of the light transmission distribution of the moving grid 403 and the stationary grid 404. The width of the ascendant intensity area 422 and the descendant intensity area 424 of the one-phase signal 420 are determined mainly by the ratio of the pattern width between the black pattern 416 and the white pattern 418 of the stationary grid 404. The longer the width of the black pattern 416, the shorter the width of the descendant intensity area 418, i.e. the higher the asymmetry.

The one-phase signal actually detected has a broad intensity change in the area 426 near to the minimum intensity Vn and the area 428 near to the maximum intensity Vm due to the effect of the diffractive expansion, and exhibits an intensity change similar to that in the neighborhood of the upper part of the sinusoidal wave. The broadness of the intensity becomes more conspicuous with the increase of the effect of diffraction. A broad intensity change reduces the detection accuracy of the grid position, and therefore the grid shape is required to be corrected in such a manner that the intensity change of the areas 426 and 428 approaches a linearity.

Figure 13A:
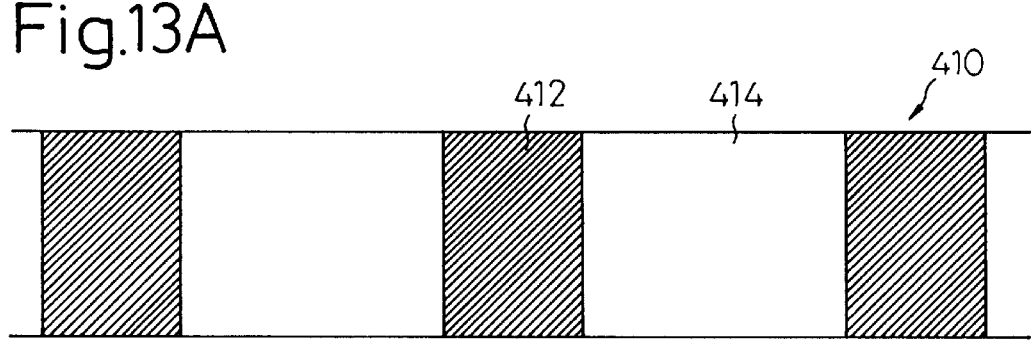
FIG. 13A is a diagram showing another light transmission distribution of the moving grid of a dimension measuring apparatus according to the fourth embodiment of the invention.
Figure 13B:
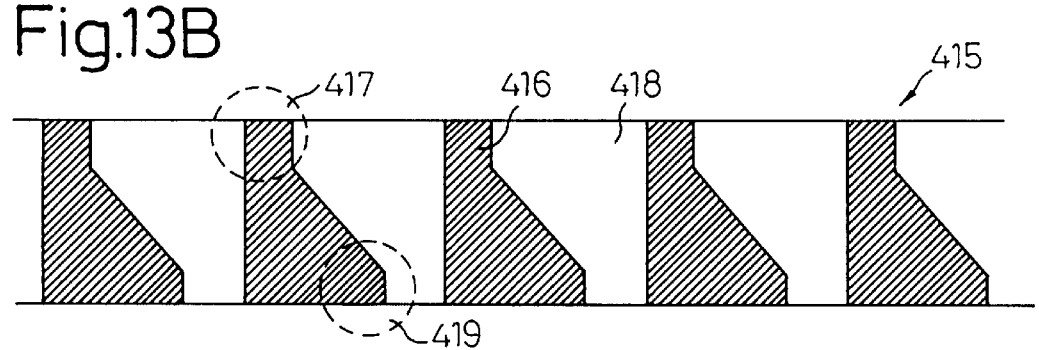
FIG. 13B is a diagram showing another light transmission distribution of the stationary grids of a dimension measuring apparatus according to the fourth embodiment.

An example of the grid shape for improving the linearity of the transmitted light intensity by modulating the shape of the stationary grid 404 designated by 415 in FIG. 12C is shown in FIG. 13. The light transmission distribution 410 shown in FIG. 13A represents an example of the light transmission distribution of the moving grid 403, and the light transmission distribution 415 shown in FIG. 13B represents an example of the light transmission distribution of the stationary grid 404. As compared with FIGS. 12B and 12C described above, the relation of the length of one grid pitch between the moving grid 403 and the stationary grid 404 is given by an integer value of n=m=1 and p=2. The width of the black pattern 412 of the moving grid 403 is equal to the width of the black pattern 416 of the stationary grid 404. The width of the white pattern 414 of the moving grid 403, however, is longer than the length of one grid pitch of the stationary grid 404, thereby presenting a shape asymmetrical in the moving direction of the grid. Numeral 410 in FIG. 13A designates an example where the length of one pitch of the moving grid 403 is p=2, which may alternatively be p=4 like the example shown in FIG. 12B. What is important is to modulate the transmitted light distribution of the stationary grid 404.

In FIG. 13B, the black pattern 416 of the stationary grid 404 is so structured that a part of the oblique line of the triangle is modulated so that the oblique line is eliminated in the areas 417 and 419 in the neighborhood of the apex of the triangle and replaced by a straight line orthogonal to the moving direction of the grid. In this structure, assume that the moving grid 403 with the right side of the black pattern 412 thereof located in the area 417 on the left side of the black pattern 416 of the stationary grid 404 moves rightward from its position. The area of the white pattern 418 of the light transmission distribution 415 of the stationary grid 404 increases more than the black pattern 416 of the light transmission distribution 415 shown in FIG. 12C, so that the transmitted light intensity changes considerably. In similar fashion, assume that the moving grid 403 with the right side of the black pattern 412 thereof located in the area 419 on the right side of the black pattern 416 of the stationary grid 404 moves rightward from its position. The decrease in the transmitted light intensity due to the white pattern 418 of the stationary grid 404 is larger than for the black pattern 416 of the light transmission distribution 415 of FIG. 12C, so that the transmitted light intensity changes considerably. Specifically, the intensity change rate of the one-phase signal 420 can be increased by modulating the intensity distribution of a part of the triangular pattern of the stationary grid 404.

Figure 13C:
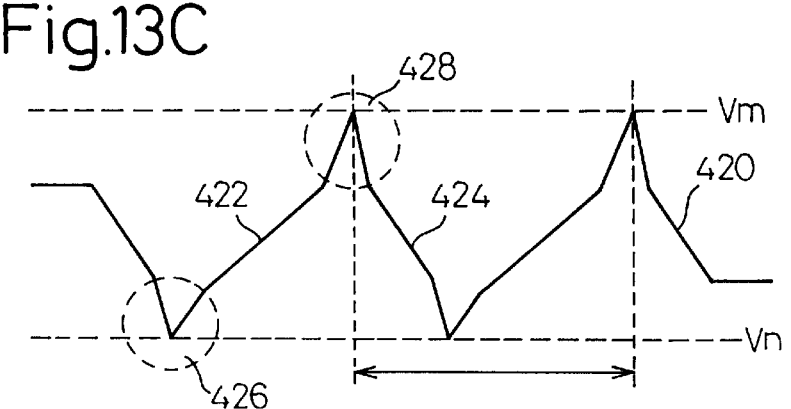
FIG. 13C is a diagram showing an example of a signal waveform using the light transmission distribution of FIGS. 13A and 13B.

Numeral 420 in FIG. 13C designates an example of a waveform of the one-phase signal 420 obtained using the grid shapes 410 and 415 shown in FIGS. 13A and 13B. Also in this case, the intensity of the one-phase signal 420 changes asymmetrically. In the ascendant intensity area 422 and the descendant intensity area 424 between the maximum value Vm and the minimum value Vn of the signal intensity, the intensity change is substantially linear as in the example waveform 420 shown in FIG. 12D. When the black pattern 412 of the moving grid 403 is moving in the neighborhood of the non-triangular areas 417 and 419 on the two sides of the black pattern 416 of the stationary grid 404, the intensity change rate in the areas 426 and 428 of the one-phase signal 420 is larger than that in the areas 422 and 424, and the intensity changes sharply.

The aforementioned example of the waveform is also indicative of the intensity change which could be realized in the ideal state in the absence of diffractive expansion. In the case where the diffraction actually occurs, however, a broad intensity changes occurs in the areas 426 and 428 in the example of the waveform 420 shown in FIG. 13C. The intensity change is large, however, as compared with the areas 426 and 428 in the waveform example 420 of FIG. 12D. Assuming, for example, that the grid position is detected with the resolution of 0.1 $\mu$m by segmenting one cycle into 100 parts in the case where the length of one cycle of the one-phase signal 420 corresponds to 10 $\mu$m, it is necessary that the 1% change of the amplitude of the transmitted light intensity can be detected. In other words, the length of one pitch of the moving grid 403 described above and the shape of the stationary grid 404 associated with the particular pitch is determined in such a manner that an intensity change of 1% can be detected.

An explanation will be given of the signal processing operation for measuring the dimension by processing the one-phase signal detected in the structure of the two-phase grids described above. Take the processing of the asymmetrical one-phase signal 420 shown in FIG. 12D as an example. In dimension measurement, it is necessary to detect the number of signals (number of movements) for each period of the one-phase signal 420 caused with the movement of the moving grid 403, the direction of the movement and the distance covered within one period. The number of signals is counted using an ordinary counter with the trigger point set, for example, at the position associated with the minimum intensity Vn of the one-phase signal. The direction in which the grid moves is determined from the asymmetry between the width and the intensity change rate in the directions in which the signal intensity increases and decreases.

The main factor for determining the resolution of the dimension measurement is the number of parts into which one cycle of the one-phase signal is segmented. For high-resolution measurement, the number of segments must be increased. In the case where one cycle of the one-phase signal corresponds to 10 $\mu$m, for example, the realization of the measurement resolution of 0.1 $\mu$m requires that one cycle of the one-phase signal be segmented into at least 100 parts to determine the grid position. In the description that follows, reference is made to the grid position detection means for accurately detecting the moving distance of not more than one grid pitch.

Figure 14A:
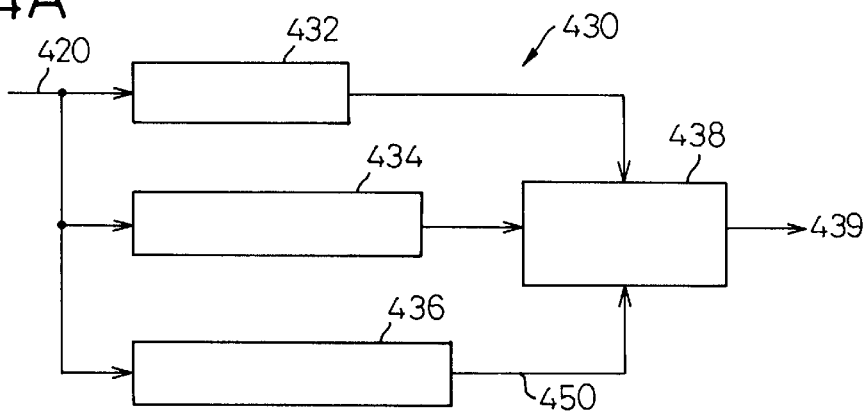
FIG. 14A is a diagram showing a signal processing system of a dimension measuring apparatus according to the fourth embodiment of the invention.

FIG. 14A is a block diagram showing a configuration of the signal processing system 430 for detecting the grid position. In FIG. 14A, numeral 432 designates an intensity detector for detecting and storing the intensity value of the one-phase signal 420 obtained continuously temporally. In the process, the signal intensity is detected and stored for a specified length of time during which the moving grid 403 moves or, for example, the time length of several cycles of the one-phase signal. Thus, in accordance with the movement of the grid, the old data are erased and new data are sequentially stored.

Numeral 434 designates a differential intensity detector for detecting and storing the differential intensity constituting the difference of intensity of the one-phase signal 420 before and after the movement of the moving grid 403. In this case, too, the differential intensity is stored for the same length of time as in the intensity detector 432. Numeral 436 designates a digitized signal counter which, by sampling the temporally continuous one-phase signal 420 and converting it into a temporally discontinuous digitized signal using an A/D converter, counts the number of the digitized signals. Also in this case, the number of the digitized signals is counted for each preset time length during which the moving grid 403 moves. By the way, the number of the digitized signals is counted in the case where the intensity differs before and after the movement of the digitized signal. Once the movement of the moving grid 403 stops, therefore, the number of the digitized signal is zero. Numeral 438 designates a grid position detector for segmenting one period of the one-phase signal 420 finely and calculating the grid position 439 from the output data of the intensity detector 432, the differential intensity detector 434 and the digitized signal counter 436.

Figure 14B:
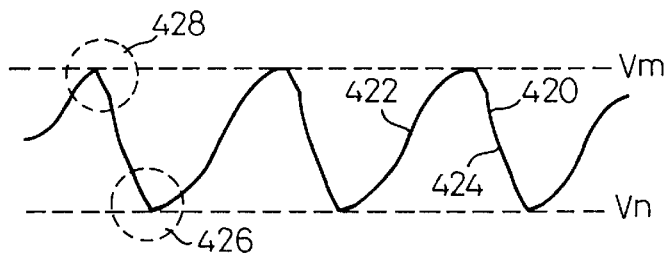
FIG. 14B is a diagram showing an example of a signal waveform of a dimension measuring apparatus according to the fourth embodiment.

FIG. 14B shows an example of a waveform of the one-phase signal 420 detected temporally continuously. The signal intensity is such that the intensity change is broadened especially in the areas 428 and 426 in the neighborhood of the maximum intensity Vm and the minimum intensity Vn under the effect of the diffractive expansion. In the areas 422 and 424 of intermediate intensity, the intensity changes linearly. Also, the one-phase signal 420 is an asymmetric signal with the intensity thereof nonlinearly changing. In the case where only one signal is involved, two different positions correspond to the same intensity, and therefore must be discriminated from each other. For this purpose, the positions are discriminated by reference to the differential intensity information. In the case where the grid moves in the direction of ascending intensity, the differential intensity assumes a positive value, while in the case where the grid movement is in the direction of descending intensity, on the other hand, the differential intensity assumes a negative value. Thus, whether the differential intensity assumes a positive or negative value is used for determining whether the grid position is located in the ascending intensity area 422 or the descending intensity area 424.

Figure 14C:
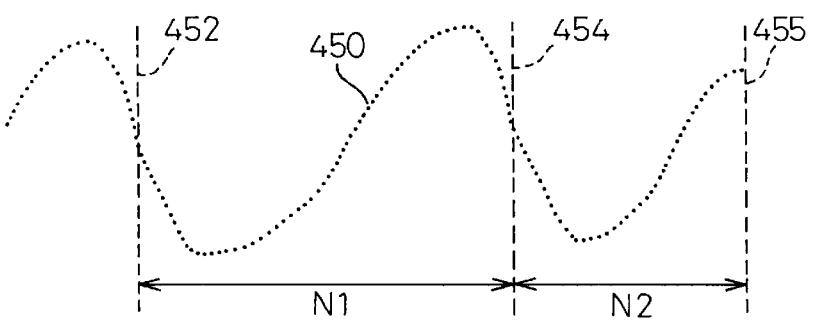
FIG. 14C is a diagram showing an example of a waveform of digitized signals of a dimension measuring apparatus according to the fourth embodiment.

Generally, in the case where the intensity change is nonlinear and especially the intensity of the one-phase signal 420 undergoes a change, it is difficult to detect the grid position from the intensity value. In view of this, according to this embodiment, the grid position is accurately detected by using the digitized signals at the same time even in the case where the intensity change is nonlinear. The signal 450 in FIG. 14C is a digitized signal detected while sampling the continuous one-phase signal 420 by an A/D converter or the like. In detecting the grid position with an accuracy of one grid pitch segmented into 100 parts in the case where the length of one grid pitch is 10 μm and the moving speed of the probe is 1 m/sec, for example, the sampling frequency of not less than 10 MHz is required.

As long as the moving grid 403 moves at a constant speed, the number of the digitized signals 450 is constant within one cycle thereof. A change in moving speed also changes the number of digitized signals. By detecting the number of digitized signals for a predetermined length of time, therefore, the change of the moving speed of the moving grid 403 can be detected from the change in the number of signals. The detection of the change in moving speed by detecting the number of digitized signals is effective for the detection of the grid position in the case where the moving speed of the moving grid 403 changes and the detection of the inversion of the moving direction of the moving grid 403.

As a reference position for detecting the number of signals within one cycle of the digitized signal 450, the positions 452, 454 where the intensity change rate is maximum are determined. Assume that number of the digitized signals 450 for one cycle thereof is N1. The intensity value of the continuous one-phase signal 420 is detected at the same time as the number of digitized signals. In detecting the grid position at the position 455, for example, the number N2 of the digitized signals from the reference position 454 to the position 455 is compared with the number N1 of the signals for one cycle immediately before the reference position 454.

As long as the moving speed of the moving grid 403 is constant, the ratio between the two signal numbers N1 and N2 is calculated and the grid position 455 detected in the grid position detector 438. The signal number N1 corresponds to the length of one pitch of the stationary grid and therefore the position of the moving grid can be determined by a simple proportionality calculation. Even in the case where the intensity of the one-phase signal changes nonlinearly, therefore, the position of the moving grid can be detected without using the correlation between the intensity value of the one-phase signal and the position of the moving grid.

In the case where the moving speed of the probe changes in the process of detecting the position of the moving grid described above, the numbers N1 and N2 of the digitized signals are not proportional to each other. Unless the moving speed is constant, the number of the digitized signals is corrected by referring to the signal intensity data as well as the number of signals. Assume that the intensity value of the one-phase signal 420 is Va and the number of signals is Na in the case where the intensity Va is obtained during the immediately preceding one cycle. In the case where the number of signals N2 is obtained at the position 455, the virtual number of signals No on the assumption that the moving grid has moved for one cycle at the particular speed is given as No=N1·N2/Na. In this case, the moving speed of the probe is assumed to change linearly during several periods in the neighborhood of the reference position 454. The estimated number of signals No corresponds to the length of one grid pitch, and therefore the grid position 455 is determined by the proportionality calculation of No and the measurement N2.

As described above, even in the case where the intensity of the one-phase signal 420 changes nonlinearly and the moving speed of the moving grid 403 is not constant, the position of the moving grid can be determined with high accuracy without preparing the table of correlation between the intensity value of the one-phase signal and the grid position. Specifically, by detecting both the intensity value of the one-phase signal and the number of the digitized signals, the grid position can be determined with high accuracy by segmenting the length of one cycle of the one-phase signal 420 into a multiplicity of parts from the correlation between the intensity value and the number of digitized signals.

The detection of the number of the digitized signals 450 described above is effective for detection of the inversion of the direction in which the probe moves as well as the detection of the grid position. In the case where the direction in which the probe moves is inverted at the intermediate intensity between maximum intensity Vm and minimum intensity vn of the one-phase signal 420 shown in FIG. 14B, the inversion of the probe can be easily determined by the fact that the direction of intensity change is inverted. In the case where the moving direction of the probe is inverted in the neighborhood of the area 428 or 426 where the intensity change broadens, however, the inversion is difficult to detect. With the configuration according to the present embodiment, however, the inversion of the direction of movement in the broad area where the intensity change is broad can be accurately detected.

Figure 15:
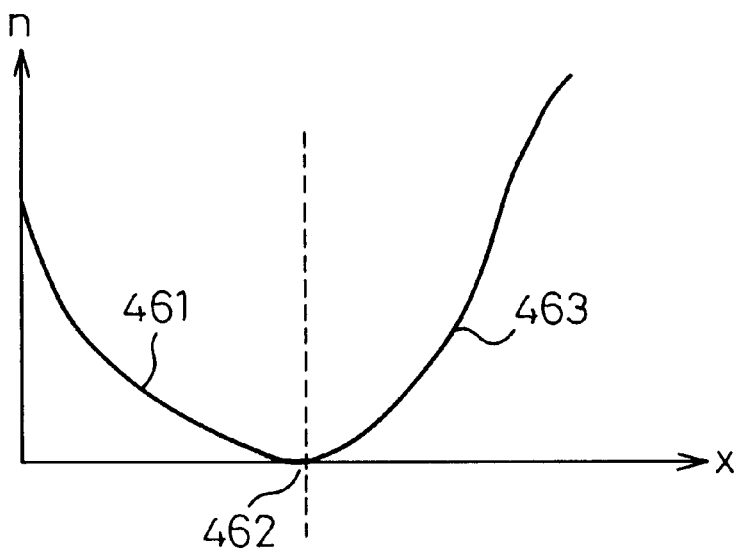
FIG. 15 is a diagram showing an example of detecting the inversion of the moving direction of the moving grid in a dimension measuring apparatus according to the fourth embodiment of the invention.

The detection of the inversion of the direction of movement will be explained with reference to FIG. 15 showing the change of the number of the digitized signals with the movement of the moving grid 403. In FIG. 15, reference character n designates the number of digitized signals and character x the position of the moving grid. FIG. 15 shows an example of the case in which the probe rises from the reference position where has thus far been stopped and after reaching the highest point, falls down. In the process, the moving speed changes in the neighborhood of the highest point. The curve 461 designates the number of digitized signals while the probe is rising at a position near the highest point, where it is seen that the number of the signals decreases and therefore the moving speed slows down. The line 463 indicates the number of digitized signals while the probe is falling down from the position near the highest point, where in view of the fact that the number of signals is increasing, the moving speed is seen to have increased. The moving speed at the position 462 is zero. Thus, it is determined that the moving direction of the probe is inverted at the position 462 where the number of the digitized signals changes from downward to upward.

Figure 16:
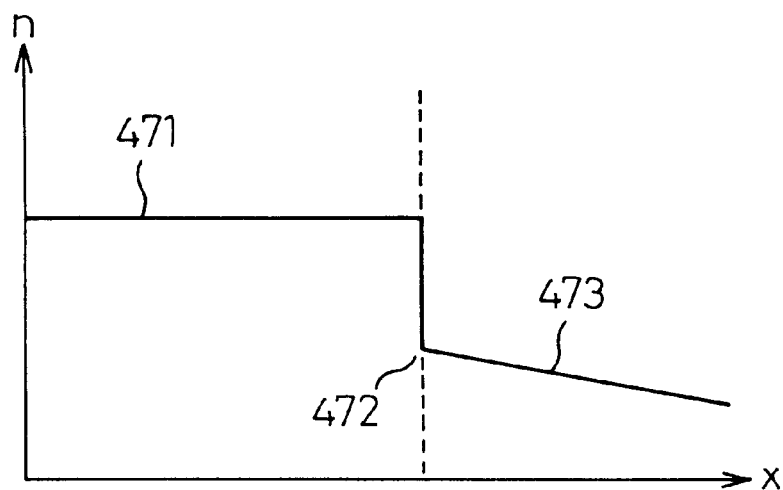
FIG. 16 is a diagram showing an example of detecting the inversion of the moving direction of the moving grid in a dimension measuring apparatus according to the fourth embodiment of the invention.

FIG. 16 shows the change of the number of digitized signals that occurs when the probe falls down and rebounds upward by bombarding the test piece. In FIG. 16, reference character n designates the number of digitized signals and character x the position of the moving grid 403. The line 471 shows the probe in downward movement at an almost constant speed. The line 473, on the other hand, indicates the probe rising by rebounding on the test piece and represents the decreasing moving speed. The position 472 is where the moving direction of the probe is inverted. At the position 472, the number of the digitized signals changes discontinuously, and therefore the position where the probe has been inverted in direction can be detected by detecting the sharp change of the number of signals. The number n of digitized signals shown above is the number detected per unit time.

As apparent from the foregoing description, according to the fourth embodiment, the effect of the diffractive expansion is reduced by differentiating the length of one pitch and the light transmission distribution between the moving grid and the stationary grid, thereby generating a one-phase signal in which the light intensity transmitted through the two-phase grids changes substantially linearly. Further, by detecting the intensity value of the one-phase signal, the differential intensity thereof and the number of digitized one-phase signals, if any, the accuracy of segmenting one grid pitch is improved thereby realizing a dimension measuring apparatus with high resolution even in the case where the intensity of the one-phase signal changes nonlinearly.

Although an example of detecting the light transmitted through the two-phase grids is shown above, a modification is possible in which at least one of the two-phase grids reflects the light and the light reflected from the grid is detected. Also, in spite of the forgoing description of the dimension measurement, the invention is applicable also to other fields such as positioning.

(Fifth Embodiment)

A fifth embodiment will be described below.

The optical system of a dimension measuring apparatus according to the fifth embodiment uses one moving grid and two stationary grids with the length of one pitch differentiated between the moving grid and the stationary grid to output non-sinusoidal two-phase symmetric signals. The white pattern and the black pattern of the stationary grid are rectangles having the same width and shape. The width of the white pattern and the black pattern are both a/2, and the length of one pitch of the stationary grid is a. The two stationary grids are arranged in parallel by shifting the positions thereof by about ¼ pitch. Both the white pattern and the black pattern of the moving grid are a rectangle with the same width and shape and both have the width of b/2, in which the length of one pitch of the stationary grid is b. In the process, the system is set to a specific relation given as b>a.

In the above-mentioned configuration, the relation between the length of one pitch of the moving grid and that of the stationary grid is set to b=ma (m≧3), where m is an odd integer larger than 1. Specifically, the width of each of the black pattern and the white pattern of the moving grid is set to a length equal to the sum of an integer multiple of the length of one pitch of the stationary grid and the width of one half of the pitch of the stationary grid. It is important to add the extra width of one half of the grid pitch. This setting is effective in the case where the moving grid is arranged behind the light source and the stationary grid is arranged behind the moving grid to detect the transmitted light. Conversely, in the configuration of arranging the stationary grid behind the light source and arranging the moving grid behind the stationary grid, the length of one pitch of the stationary grid is set longer than that of the moving grid.

Once the moving grid is moved, two-phase signals changing for each period corresponding to the length of one pitch of the stationary grid is produced. This is by reason of the fact that the length of one pitch of the moving grid is set to an odd multiple of the length of one pitch of the stationary grid. Thus, a signal having a period equal to the pitch of the stationary grid is obtained regardless of the length of the pitch of the moving grid. Assuming that m=3, for example, the movement of the moving grid over the distance of one pitch produces a signal corresponding to three cycles. The phase of the two-phase signals is changed in accordance with the length by which the grid positions of the two stationary grids are shifted. Assuming that the positions of the two-phase signals are shifted by one fourth of the length a (one pitch), for example, the phases of the two-phase signals are shifted by one fourth of a cycle. The distance by which the stationary grids are shifted is not necessarily the exact one fourth of a pitch but a length near to the figure described above.

Generally, the light transmitted through a tiny opening tends to expand due to the diffraction. The smaller the opening width, the larger the effect of the diffraction. The moving grid according to this invention has a long grid pitch, and therefor the effect of diffraction of the light transmitted through the moving grid can be remarkably reduced by setting the grid pitch to 30 μm or more instead of the figure of about 10 μm for the prior art. As a result, the light transmission distribution substantially retaining the geometric shape of the moving grid can be obtained in the neighborhood immediately behind the moving grid, for example, at a position rearward from the moving grid by about several tens of μm which is approximate to the pitch of the moving grid. Therefore, the stationary grid is arranged at the position several tens of μm behind the moving grid.

In the arrangement of the optical scale configured with the moving grid and the stationary grid described above, the image of the moving grid formed at the position of the stationary grid is masked by the black pattern of the stationary grid and the transmitted light intensity is detected from the overlapped area of the two white patterns of the moving grid and the stationary grid. Since the diffractive expansion of the moving grid is small for its long grid pitch, a transmitted light distribution is detected which is substantially equivalent to the geometrically overlapped shape of the two white patterns of the moving grid and the stationary grid. Thus, the area is widened where the transmitted light intensity changes substantially linearly within one cycle of the two-phase signals, so that a pseudo-triangular wave signal is detected. The residual effect of diffraction, however, changes the signal intensity broadly in the neighborhood of the maximum intensity and the minimum intensity. In order to detect a transmitted signal with a superior contrast by improving the S/N ratio of the transmitted light intensity, the transmitted light intensity is detected by forming a grid pattern of the stationary grid directly on the light receiving surface of each of the two photodetectors and integrating the stationary grid and the photodetectors.

The signal processing system of the dimension measuring apparatus according to the fifth embodiment is so configured as to detect the moving distance of not more than one cycle of the two-phase signals with a high resolution, and provides an effective detection method in the case where the signal intensity linearly changes in the intermediate area except for the neighborhood of the maximum intensity and the minimum intensity of the two-phase signals. In this case, the signal intensity is not detected in the neighborhood of the maximum intensity and the minimum intensity where the intensity of the two-phase signals nonlinearly changes broadly. Instead, the signal with the intensity linearly changing is selected alternately from the two-phase signals, and the stop position of the moving grid is detected from the signal intensity of the selected signal. In the case where the signal intensity linearly changes in accordance with the change of the position of the moving grid, the grid position can be easily determined by simple proportionality calculation of the signal intensity.

In the case where the phases of the two-phase signals detected are different by about one fourth of a cycle, the intensity of one signal is about intermediate if the intensity of the other signal is in the neighborhood of the maximum intensity or the minimum intensity. In such area, the signal intensity changes linearly. The two-phase signals are compared with a predetermined slice-intensity, and one signal with the intensity linearly changing is selected from the two-phase signals and the intensity of the signal is detected. In the process, the quadrant (① to ④) of the two-phase signals with one cycle thereof segmented into four parts is also detected. The signal in the linear area is alternately selected for each one fourth of a cycle of the two-phase signals in accordance with the movement of the moving grid, and therefore the A-phase signal and the B-phase signal are each selected twice for each cycle.

Once the quadrant, where the linearly changing signal detected by segmenting one cycle of the two-phase signals into four quadrants is located, is determined from the quadrants ① to ④, the grid position can be detected from the signal intensity in the particular quadrant and the quadrant information. The intensity at the stop position of the moving grid, as compared with the maximum intensity and the minimum intensity of the linear signal, is determined by the proportionality calculation thereby to detect the grid position within the particular quadrant. The moving distance of not more than one cycle of the two-phase signals is detected from the two grid positions detected as above. This detection uses the intensity information only for the linear area of the two-phase signals, and therefore the grid position can be detected with high accuracy.

A dimension measuring apparatus 500 according to the fifth embodiment will be explained in detail with reference to FIG. 17A. A light source 501 is configured with a LED or the like, from which the divergent light is emitted and radiated on a moving grid 503 directly. The moving grid 503 is mounted on a probe (not shown) and adapted to move in the directions of A and B indicated by arrows. According to this invention, the divergent light is radiated directly on the optical scale, and therefore the collimator lens or the like for conversion into parallel light rays is eliminated thereby reducing the size of the optical system.

The stationary grids 504A and 504B (hereinafter referred to as "the stationary grids 504" representing the two stationary grids) are arranged the distance F behind the moving grid 503. The moving grid 503 and the stationary grids 504 are called an optical scale. Photodetectors 505A, 505B are arranged behind the stationary grids 504A, 504B and output two-phase signals 520, 525. The signal 520 is called the A-phase signal and the signal 525 the B-phase signal. The signal processing system 530 processes the two-phase signals 520, 525 variously for calculating the dimension from the distance covered by the moving grid 503.

Figure 17A:
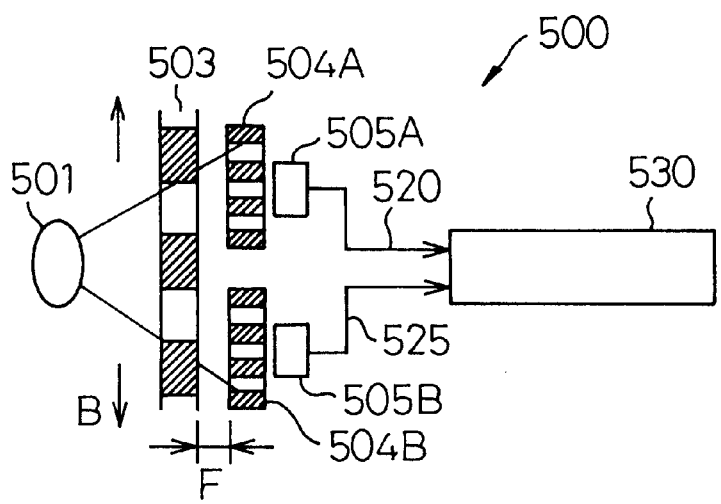
FIG. 17A is a diagram schematically showing a dimension measuring apparatus according to a fifth embodiment of the present invention.
Figure 17B:
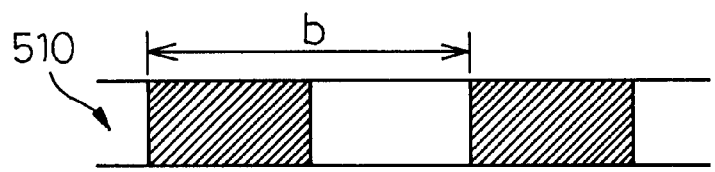
FIG. 17B is a diagram showing an example of the light transmission distribution of the moving grid in FIG. 17A.
Figure 17C:
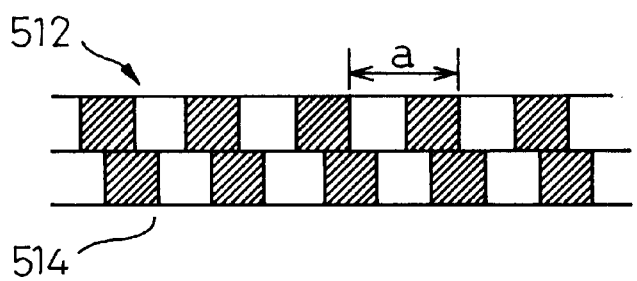
FIG. 17C is a diagram showing the light transmission distribution of the stationary grids in FIG. 17A.

The light transmission distribution 510 shown in FIG. 17B represents the light transmission distribution of the moving grid 503, and the light transmission distribution 512, 514 in FIG. 17C represent the light transmission distribution of the stationary grids 504A, 504B, respectively. The grid of the optical scale is configured with binary light transmission elements of a white pattern transmitting a large amount of light and a black pattern transmitting a small amount of light, and differentiates the length of one pitch of the moving grid 510 and the stationary grids 504A, 504B. The length of one pitch of the light transmission distribution 512, 514 are both a (10 $\mu$m). The light transmission distributions 512, 514 both are rectangular in shape and the same width of the black pattern and the white pattern with the positions thereof are shifted from each other by about one fourth of a pitch. This shift amount, though preferably one fourth of a pitch, may alternatively be approximately one fourth of a pitch.

The light transmission distribution 510 of the moving grid 503 has the length b of one pitch, and is a rectangle having a black pattern and a white pattern of the same width and shape. At the same time, the length of one pitch of the moving grid 503 is set to a value longer than one pitch of the stationary grids 504, which value is an odd integer multiple of the particular pitch. In the case under consideration, the relation b=3a holds, so that the width of the black pattern and the white pattern for a of 10 $\mu$m are 15 $\mu$m, and b=30 $\mu$m, respectively.

The width of the grid pitch of the moving grid 503 is increased in order to reduce the diffractive expansion caused when the moving grid 503 is irradiated. The angle of the diffractive expansion is inversely proportional to the width of the grid pitch of the moving grid 503. The opening width (width of the white pattern), if three times as large as that of the prior art and, therefore, reduces the diffractive expansion to one third. As a result, an image of the light transmission distribution substantially equivalent to the geometric shape of the moving grid 503 is formed up to a position immediately behind the moving grid 503, for example, up to a position within about the grid pitch of the moving grid 503. The stationary grids 504A, 504B are located at the particular position, and the photodetectors 505A, 505B are arranged immediately behind the stationary grids 504A, 504B for detecting the intensity of the light transmitted through the optical scale.

The transmitted light is detected preferably by bringing the stationary grid 504A substantially into contact with the photodetector 505A on the one hand and the stationary grid 504B substantially into contact with the photodetector 504B on the other hand. For this purpose, the grid pattern of each of the stationary grids 504A, 504B may be directly formed on the light receiving surface of each of the photodetectors 505A, 505B thereby to integrate the stationary grids and the photodetectors with each other. The integrated structure improves the S/N ratio for detection of the transmitted light and produces two-phase signals with a high contrast.

FIG. 17A shows an example in which the stationary grids 504A, 504B are arranged in the neighborhood immediately after the moving grid 503. In the case where the light emitted from the light source 501 is parallel light rays, however, the stationary grids 504A, 504B may be arranged at the Fourier image position F determined by the grid pitch length of the moving grid 503. Assuming that the length of one pitch of the moving grid 503 is 30 μm and the average wavelength λ of the radiated light is 600 nm, for example, the Fourier image distance F is about 1.5 mm. As compared with the conventional moving grid having the grid pitch length of 10 μm, the gap between the moving grid 503 and the stationary grid 504 increases considerably. Therefore, even when the gap width is displaced by about 100 μm, the signal intensity and the signal shape are not substantially affected by the change of the grid position, thereby making stable measurement possible.

Figure 17D:
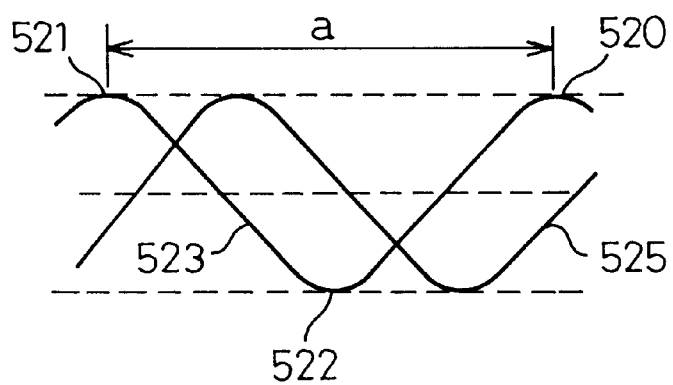
FIG. 17D is a diagram showing an example of a signal waveform in FIG. 17A.

The examples of the waveforms of the two-phase signals 520 and 525 shown in FIG. 17D are both symmetric signals with the phases shifted by one fourth of a pitch from each other. The phase shift between the two-phase signals is determined by the shift of the set positions of the stationary grids 504A, 504B. One cycle of the two-phase signals 520, 525 corresponds to the length a of one grid pitch of the stationary grids 504A, 504B. In spite of the long grid pitch of the moving grid 503, a signal of the cycle corresponding to the pitch of the stationary grids can be detected by reason of the fact that the grid pitch of the moving grid 503 is set to an odd multiple of the pitch of the stationary grids 504. In other words, even in the case where the grid pitch of the moving grid 503 is lengthened, the width of one period (10 μm) of the two-phase signals is so short that the measurement is possible with high sensitivity.

The two-phase signals 520, 525 are pseudo-triangular wave signals with the intensity thereof changing in non-sinusoidal form and having a broad area 523 where the intensity changes linearly. This is in view of the fact that the effect of diffraction is reduced by lengthening the grid pitch of the moving grid 503. Since the diffractive expansion still has an effect, however, the intensity broadly changes non-linearly and deviates from the straight line in the maximum intensity area 521 and the minimum intensity area 522. As compared with the conventional sinusoidal wave signal, the two-phase signals according to the invention have the feature of a wide area 523 of linearly changing intensity, and the length of one cycle of the signal is segmented by using only the intensity data of the linear area 523 thereby to determine the grid stop position with high accuracy.

Since the phases of the two-phase signals 520, 525 are shifted from each other, as in the two-phase sinusoidal wave signals, the direction in which the moving grid 503 moves can be easily detected from the relation between the lead and lag of the phase. Also, by counting each movement of the signal for each period of the A-phase signal 520 as a reference, for example, the moving distance equal to an integer multiple of the length of one grid pitch of the stationary grids 504 is detected.

Figure 18A:
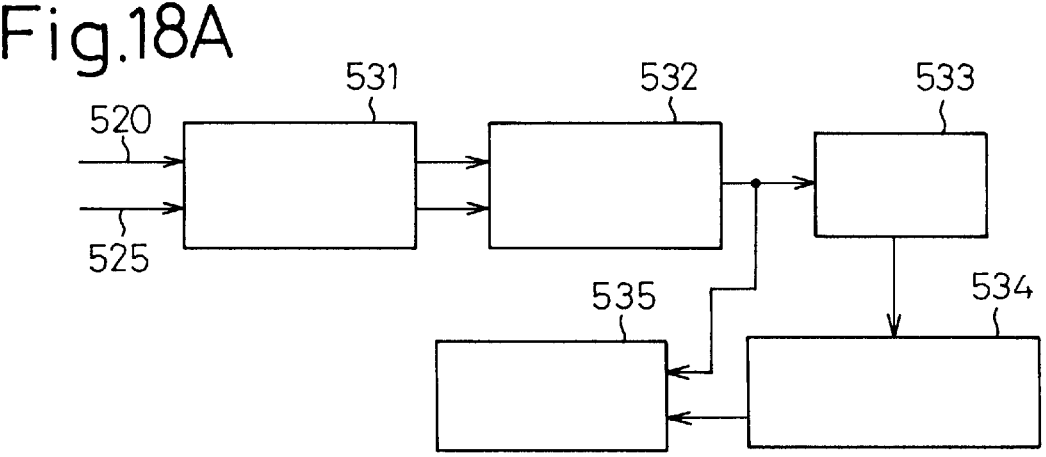
FIG. 18A is a diagram showing a signal processing system of a dimension measuring apparatus according to the fifth embodiment of the present invention.

FIG. 18A shows a specific example of detecting the stop position of the moving grid by segmenting one cycle of the two-phase signals into a multiplicity of small parts in the signal processing system 530 of FIG. 17A. In FIG. 18A, a two-phase signal intensity detector 531 detects the intensity of the A-phase signal 520 and the B-phase signal 525 output from the photodetectors 505A and 505B, respectively. A two-phase signal intensity comparator 532 compares the magnitude of intensity of the two-phase signals 520 and 525 with a predetermined slice-intensity, while at the same time determining a particular signal quadrant (① to ④) constituting one of the four segments (quadrants) into which one cycle of the two-phase signals is segmented. Each quadrant will be described later. A signal selector 533 selects the A-phase signal 520 or the B-phase signal 525 to be detected, based on the result of intensity comparison by the two-phase signal intensity comparator 532. What is to be detected is the signal of which the intensity is changing linearly.

A linear area intensity detector 534 detects the linear intensity linearly changing within the slice-intensity level from the signal selected by the signal selector 533. The A-phase signal 520 and the B-phase signal 525 are alternately selected substantially at a pitch of one fourth of one cycle, so that four types of linear signals are detected for each cycle. The aforementioned configuration makes it possible to selectively detect only the intensity of the area where the two-phase signals change linearly without detecting the intensity of the area where the two-phase signals are nonlinearly changing broadly. A first grid position detector 535 detects the grid position by segmenting one cycle of the two-phase signals into a multiplicity of small parts based on the quadrant position information from the two-phase signal intensity comparator 532 and the intensity information from the linear area intensity detector 534.

Figure 18B:
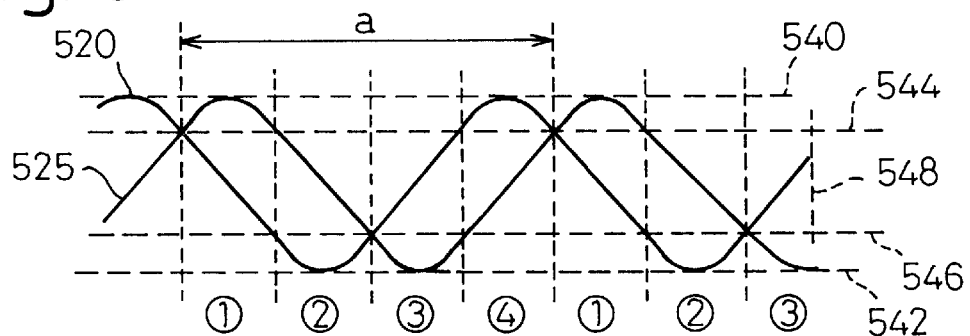
FIG. 18B is a diagram showing an example of a waveform of two-phase signals of a dimension measuring apparatus according to the fifth embodiment.

In the two-phase signal waveform of FIG. 18B, assume that the A-phase signal 520 and the B-phase signal 525 have substantially the same intensity (the intensity of the two-phase signals are not necessarily exactly the same according to the invention), so that the phase of the two-phase signals are shifted by one fourth of a pitch. The slice-intensities 544 and 546 for comparing the magnitude of the intensity of the two-phase signals are set between the maximum intensity 540 and the minimum intensity 542. For example, the slice-intensity is set to a level where the intensity of the two-phase signals 520 and 525 are equal to each other. The two-phase signal intensity comparator 532 compares this slice-intensity with the magnitude of the intensity of the two-phase signals, and determines one of the four quadrants ① to ④ into which one cycle of the signal is segmented.

In the case where the intensity of the B-phase signal 525 is larger than the intensity of the A-phase signal 520 and larger than the slice intensity 544, the grid is located in the quadrant ①. In the case where the intensity of the B-phase signal 525 is smaller than the intensity of the A-phase signal 520 and smaller than the slice-intensity 546, the grid is located in the quadrant ③. Once the quadrant of the grid position is determined, the signal selector 533 determines which signal is to be selected, the A-phase signal 520 or the B-phase signal 525. In the case of the quadrant ①, for example, the intensity of the B-phase signal 525 is located in the neighborhood of the maximum value and broadly changes nonlinearly, while the intensity of the A-phase signal 520 changes linearly. In the quadrant ①, therefore, the A-phase signal 520 is selected. In the case where the grid is located in the quadrant ②, on the other hand, the B-phase signal 525 is selected.

Figure 18C:
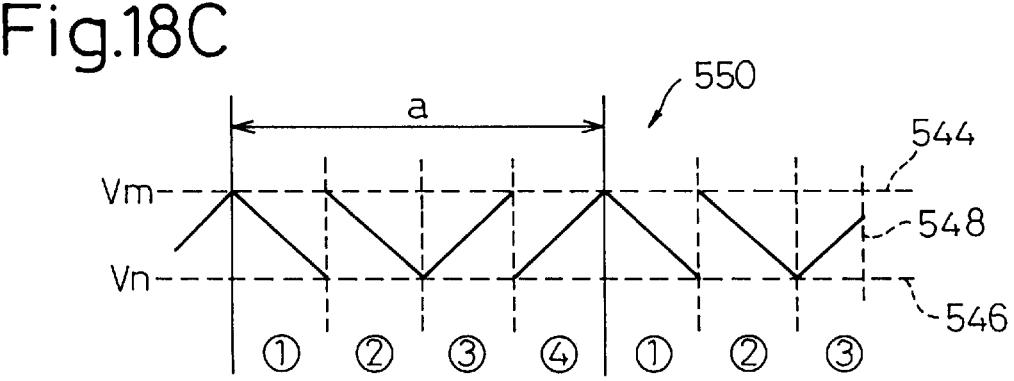
FIG. 18C is a diagram showing an example of a signal in the linear area of a dimension measuring apparatus according to the fifth embodiment.

Numeral 550 in FIG. 18C designates a signal in the linear area selected by the signal selector 533 and detected from the quadrants ① to ④. During the length of one cycle, the A-phase signal 520 and the B-phase signal 525 are each detected twice alternately. This linear intensity of the same level appears in decreased and increased forms each twice, and therefore the quadrant of the signal for discriminating the intensity of the descendant intensity area (quadrants ① and ②) is detected at the same time. This quadrant information provides an approximate position of the four quadrants into which one cycle is segmented. For example, the grid position for the quadrant ② is in the range of a/4 to a/2.

Assume that the amplitude of the intensity of the linear signal is equal in the quadrants ① to ④, and the maximum intensity and the minimum intensity of the linear signal are Vm and Vn, respectively. Also, assume that the phase difference of the two-phase signals is ¼ pitch and the width of the quadrants ① to ④ is equal to each other. In the case where the moving grid 503 stops at the position 548 in the quadrant ③ and the intensity at the stop position is Vp, for example, the proportionality calculation is carried out between the maximum linear intensity Vm and the minimum linear intensity Vn and Vp. The grid position in the quadrant ③ is given as a(Vp−Vn)/{4(Vm−Vn)}. In the cycle of the grid stop position, the sum of the distance a/2 from the start position of the quadrant ① to the first position in the quadrant ③ and the distance in the quadrant ③ is the moving distance for the cycle at the stop position. Thus, the grid position can be determined from the quadrant information and the intensity information at the grid stop position. This is an effective method in the case where the linear area of the two-phase signal changes linearly.

An example of detecting the light transmitted through one moving grid and two stationary grids was shown. As an alternative, a modification is possible in which the light reflected from one, two or all of three reflective grids is detected. Also, the two stationary grids 504A, 504B may be moved while keeping the relative positions thereof, while the moving grid 503 may be fixed. Apart from an example of dimension measurement described above, the invention is also applicable to other fields such as positioning with equal effect.

(Sixth Embodiment)

A sixth embodiment of the invention will be explained below.

In the sixth embodiment, the process up to producing two-phase signals is similar to the corresponding process in the fifth embodiment. The signal processing system of the dimension measuring apparatus according to the sixth embodiment, however, is configured to detect the moving distance of not more than one cycle of the two-phase signals with high resolution and employs a method effective for the case in which the change rate of the signal intensity is high in the intermediate area between the maximum intensity and the minimum intensity of the two-phase signals but the change rate is nonlinear or the signal intensity is varied. In the case where the intensity of the two-phase signals changes nonlinearly in the intermediate area, unlike in the fifth embodiment described above, the grid position cannot be determined by simple proportionality calculation of the detected signal intensity, but a reference table is required for correlating the signal intensity and the grid position. In the case where the signal shape or intensity undergoes a change, however, the reference table prepared in advance is invalidated. In view of this, according to this invention, the reference table for storing the reference data defining the relation between the signal intensity and the grid position is not used, but the data obtained by measurement from the measuring instrument is utilized as a reference table.

In order to generate reference data, the first step is to digitize the two-phase signals produced as a continuous signal by a predetermined sampling period using the A/D conversion or the like. Then, the signal intensity is detected by being numbered in the order of sampling for each specified period of the digitized two-phase signals, and the number of the digitized signals is stored in a memory circuit together with the signal intensity detected during the particular period. The signal intensity and the digitization data including the number of signals detected for the specified period constitute the reference data for detecting the position of the moving grid. In this sampling detection process, the signal intensity is detected only when it is changed, while in the absence of signal intensity change as the moving grid stops, the signal intensity is not detected. In this case, too, like in the fifth embodiment described above, a signal larger in intensity change rate in the intermediate area other than the neighborhood of the maximum and minimum intensities of the two-phase signals is selected, and the intensity of the digitized signals is alternately detected by segmenting them into four quadrants of ① to ④.

The length of one pitch of the stationary grid and the sampling period are constant, and therefore, the number of signals of the digitized data detected when the moving grid moves over the distance of one pitch of the stationary grid corresponds to the length of one pitch of the stationary grid. The number of signals of the digitized data changes with the moving speed of the moving grid. The grid position within one cycle of the digitized signals is stored with the numbered intensity of the digitized data and the signal quadrant. Even for a signal having a nonlinearly changing intensity, the fact that the signal intensity corresponding to a quadrant in one cycle is numbered and stored makes it possible to determined the grid position from the quadrant and the number of order associated with the signal intensity involved. The stored signal intensity is detected in the area of a high intensity change rate, and therefore like in the fifth embodiment, the sensitivity of the grid position detection is high.

For detecting the stop position of the moving grid, the digitized data described above is compared twice at the movement start position and the stop position of the moving grid. During the normal period of movement, the data stored is sequentially updated for each period of the two-phase signals, and the data for two adjacent cycles are sequentially stored. Assuming that the moving grid stops after moving, for example, the digitization data detected during the cycle immediately preceding to the stop is used as the second digitization data providing a reference for grid position detection. Further, the digitization data detected during the period before the next stop is used as the first digitization data. Then, the signal intensity and the number of signals of the first and second digitization data are compared with each other. In this comparison process, it is assumed that the intensity and the moving speed of the moving grid are not discontinuously changed during two adjacent cycles.

In the comparison between the first digitization data and the second digitization data, the signal number associated with a specified intensity of the first digitization data is compared with the signal number associated with a specified intensity of the second digitization data. In the case where the moving grid stops after moving, for example, the signal number (number of signals) of the last signal intensity of the first digitization data is compared with the signal number of the second digitization data associated with the same signal intensity. In the case where the two signal numbers are identical, it can be determined that the moving speed is constant and the grid position can be determined from the ratio of the signal number between the first digitization data and the second digitization data.

In the case where the signal number of the last signal intensity of the first digitization data is different from the signal number of the second digitization data associated with the same signal intensity, it is determined that the moving speed of the moving grid has changed. In such a case, unlike in the foregoing case, the grid stop position cannot be determined by a simple proportionality relation of the number of signals. In view of this, the moving speed is assumed to change proportionately between adjacent two cycles, and the number of signals is estimated upon the assumption that the length of one cycle is covered at the moving speed associated with the time when the first digitization data is obtained. Then, the grid position is detected from the proportional relation between the estimated number of signals and the signal number of the first digitization data.

The signal processing system 600 of the dimension measuring apparatus according to the sixth embodiment will be explained below. In the dimension measuring apparatus according to the sixth embodiment, the optical system for producing the two-phase signals is similar to that of the dimension measuring apparatus according to the fifth embodiment shown in FIG. 17A and therefore will not be described below. Also, assume that the two-phase signals 620, 625 are output from photodetectors corresponding to the photodetectors 505A, 505B, respectively, shown in FIG. 17A.

Figure 19A:
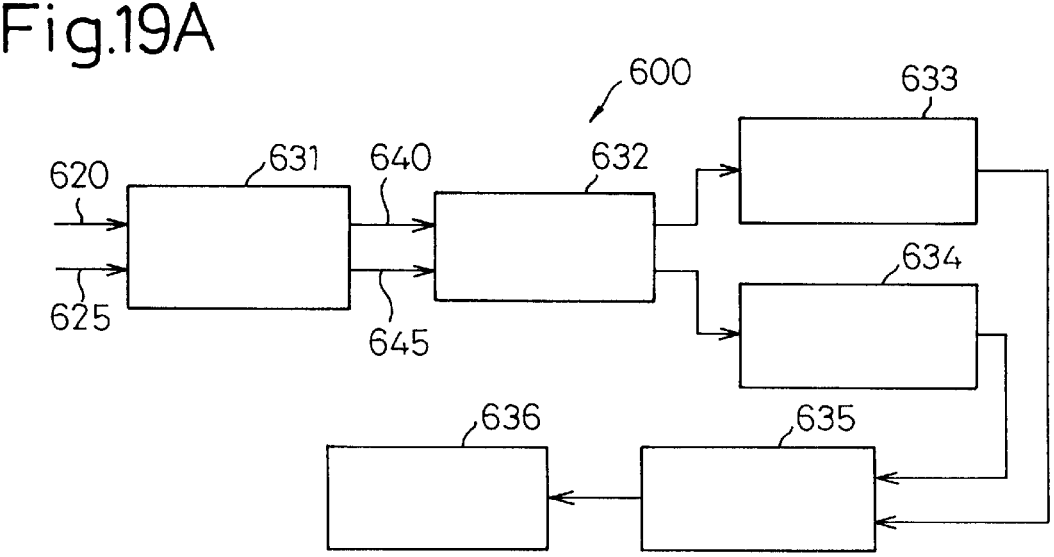
FIG. 19A is a diagram showing a signal processing system of a dimension measuring apparatus according to a sixth embodiment of the invention.
Figure 19B:
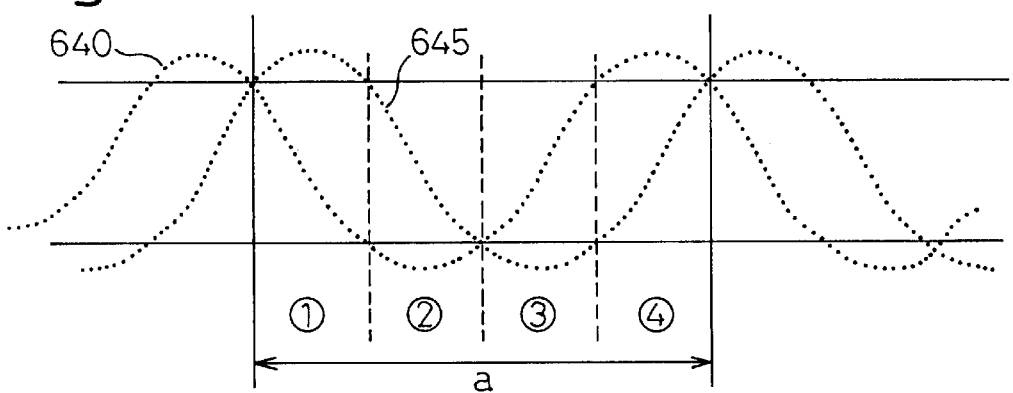
FIG. 19B is a diagram showing an example of a waveform of digitized signals of a dimension measuring apparatus according to the sixth embodiment.

FIG. 19A is a block diagram showing the signal processing system 600. In FIG. 19A, two-phase signal digitization means 631 is an A/D converter or the like for converting the continuous two-phase signals 620, 625 with a nonlinearly changing intensity into temporally digitized signals and outputting the digitized two-phase signals 640, 645 shown in FIG. 19B. The two-phase signals 620, 625 are assumed to correspond to the two-phase signals 520, 525, respectively, in the fifth embodiment.

Figure 19C:
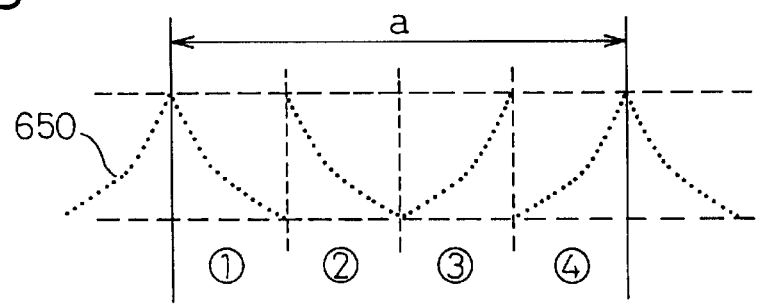
FIG. 19C is a diagram showing an example of a waveform of digitized signals in a specific area.

The digitization information detector 632, like in the fifth embodiment, detects one of the two-phase digitized signals 640, 645. The signal has a larger intensity change rate in the intermediate area compared with the other signal which is near the maximum intensity or minimum intensity. At the same time, the signal intensity is detected by being numbered in the order of sampling as described above. The waveform 650 of FIG. 19C is a digitized signal in the area having a large detected intensity change rate, and the intensity thereof changes nonlinearly. In the process, the number of the signals digitized for each specified period is detected together with the intensity of the digitized signals. Both the signal intensity and the number of signals are stored as digitization data. Thus, like the signal 550 in FIG. 18C showing the fifth embodiment, the digitization data represents a signal with one cycle segmented into four parts and having a signal intensity changing to a considerable degree.

The first digitization data storage unit 633 stores the intensity and the number of the digitized signals detected during each time length not more than one cycle from the position where the moving grid 503 starts to move to a specified reference position of the two-phase signals 640, 645 and also during each time length not more than one cycle from a specified reference position to the position where the moving moving grid 503 stops. Also, the magnitude of intensity of the digitized two-phase signals 640 and 645 are compared to thereby detect the quadrant of the signal where the first digitization data is obtained. Like in the fifth embodiment, one of the four quadrants into which one cycle of the digitized two-phase signals are segmented and where the particular quadrant is located is determined. At the same time, the specified reference position of the two-phase digitized signals is assumed to be the position where the two-phase digitized signals have the same intensity.

The second digitization data storage unit 634 stores the intensity and the number of the digitized signals detected when the moving grid 503 moves during the time length of the next one cycle following the detection of the first digitization data at the position where the moving grid 503 begins to move and during the time length of one cycle immediately before the movement of the moving grid stops. In this case, too, as in the first digitization data detector 633, the signal intensity associated with the quadrant in one cycle is detected and stored. Also, while the moving grid 503 is in motion, the digitization data detected during each one cycle are sequentially rewritten every other period.

The digitization data comparator 635 compares the intensity and the number of the digitization data signals stored in the first digitization data storage unit 633 and the second digitization data storage unit 634 for the two cycles associated with the position where the moving grid 503 begins to move and the position where it stops. In the comparison of the digitized signals at the position where the moving grid 503 begins to move, the first step is to determine the signal number of the second digitization data whose intensity is substantially equal to the signal intensity at the first position of the first digitization data. Then, the number of the signals representing the difference between the number of the signals of the second digitization data and the detected signal number is compared with the number of the signals of the first digitization data.

In the comparison of the digitization data at the position where the moving grid 503 stops, the number of the signals representing the signal number of the last signal intensity of the first digitization data associated with the intensity at the stop position is compared with the signal number of the second digitization data associated with the signal intensity substantially equal to the intensity at the stop position. This comparison is made in terms of the intensity in the same signal quadrant. In the case where the two signal numbers compared are the same in the aforementioned comparison of the number of signals, it is determined that the moving grid 503 retains the same travel speed. If the signal numbers are different, on the other hand, it is determined that the moving speed has changed.

The second grid position detector 636 detects the position where the moving grid 503 stops, based on the result of determining the correlation between the signal intensity and the number of signals at the digitization data comparator 635 and thus detects the distance of not more than one pitch of the stationary grid 504. In the case where it is determined that the moving speed of the moving grid 503 is constant, the position where the grid stops is determined from the proportional relation between the number of the signals of the first digitization data and the number of signals of the second digitization data. In the case where it is determined that the moving speed of the moving grid 503 has changed, the first step is to estimate the the number of signals on the assumption that the grid moves for the time length of one cycle at the same moving speed as when the first digitization data is acquired. Then, based on the number of signals thus estimated, the position of the moving grid is detected from the proportional relation with the number of signals of the first digitization data as a reference.

The detailed operation of the digitization data comparator 635 and the second grid position detector 636 will be explained with reference to FIG. 20. Numeral 650 in FIG. 20A designates an example of the digitized signal in an area having a large intensity change rate, and numerals 660 and 670 in FIG. 20B designate an example of the digitization data. Numeral 650 in FIG. 20A designates an example of the case in which the moving grid 503 stops at the position 652 after movement. The time length 654 is one period immediately before the movement stops, and the digitization data is detected and stored in the second digitization data storage unit 634. The data 660 in FIG. 20B is the particular digitization data which are stored in positions corresponding to the quadrants in the order of sampling the signal intensity for all the quadrants ① to ④. The number of signals per cycle is designated as p.

Figure 20A:
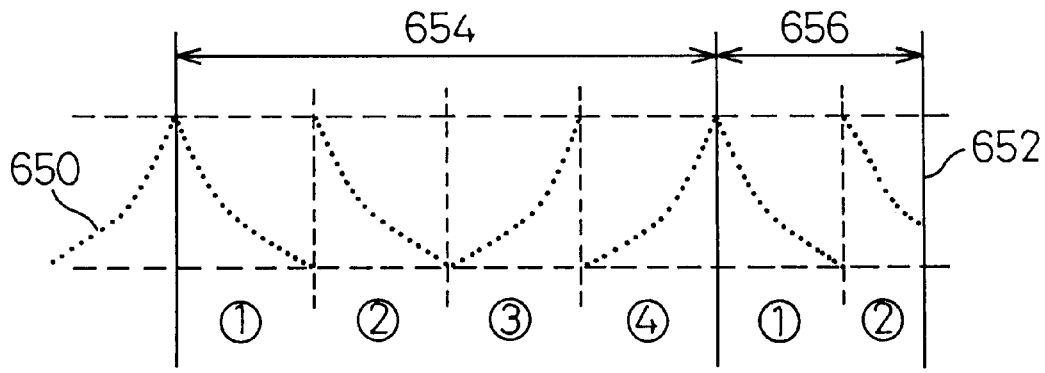
FIG. 20A is a diagram showing an example of a waveform of digitized signals in a specific area of a dimension measuring apparatus according to the sixth embodiment of the invention.
Figure 20B:
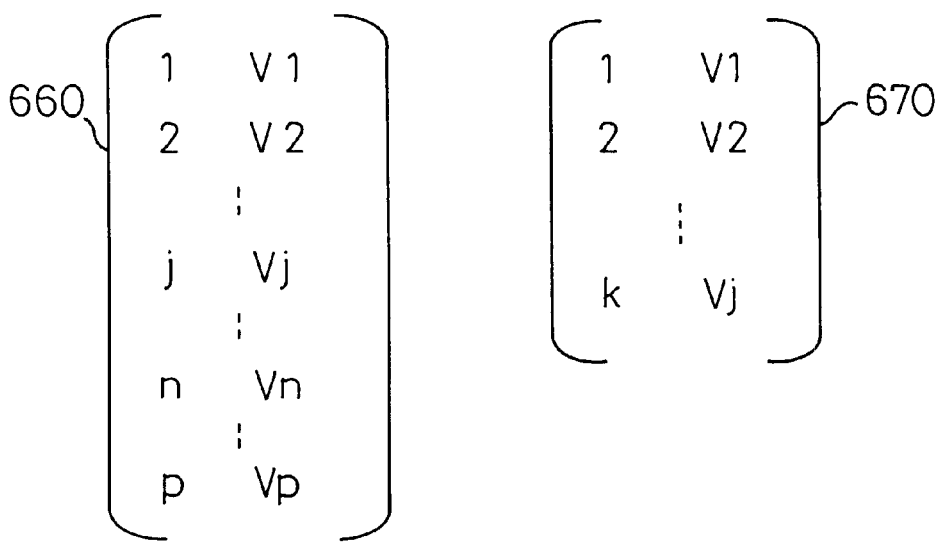
FIG. 20B is a diagram showing digitization data of a dimension measuring apparatus according to the sixth embodiment of the invention.
Figure 21A:
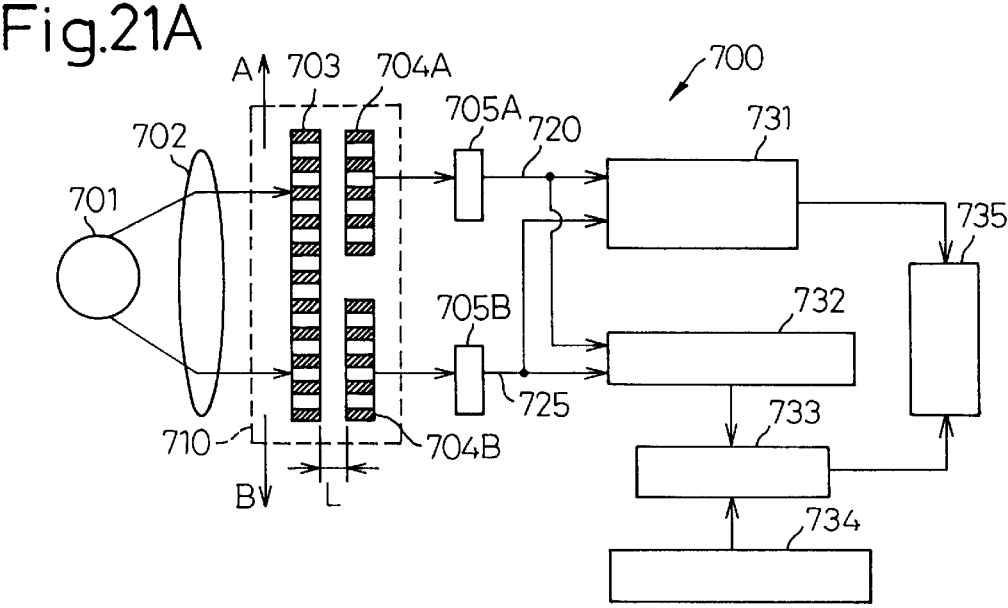
FIG. 21A is a diagram showing a conventional dimension measuring apparatus.
Figure 21B:
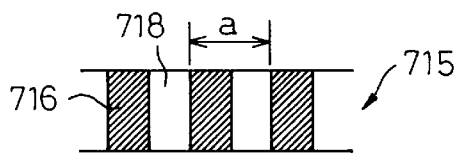
FIG. 21B is a diagram showing an example of the light transmission distribution of the grids shown in FIG. 21A.
Figure 21C:
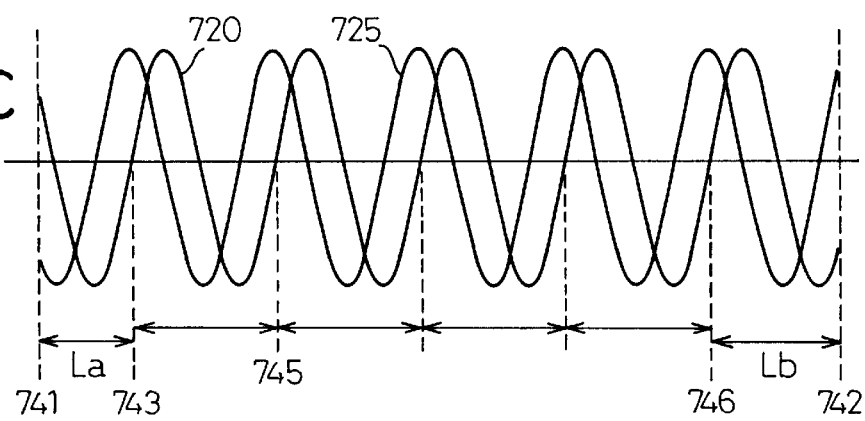
FIG. 21C is a diagram showing an example of a signal waveform shown in FIG. 21A.

Numeral 656 in FIG. 20A is the time length within one cycle before the moving grid 503 comes to a stop position. At the same time, the signal intensity is detected and stored in the first digitization data storage unit 633. The data 670 in FIG. 20B is this digitization data, which are stored at positions corresponding to the quadrants in the order of sampling the signal intensity up to the middle portion of quadrant ②. The number of signals obtained during this time length is k, and it is detected where this stop position is located in the time length of one period.

The digitization data comparator 635 compares the digitization data 660 and 670 with each other. The signal number j is detected at which the last signal intensity Vj (the signal number k in quadrant ②) of the first digitization data 670 becomes equal to the signal intensity Vj of the second digitization data 670 in quadrant ②. In the process, in the case where the k equals j, it is determined that the moving grid 503 is moving at equal speed during the two time lengths 654 and 656. Unless j and k are equal to each other, on the other hand, it is determined that the moving speed of the moving grid 503 has changed between the two time lengths.

The second grid position detector 636 detects the grid position associated with the signal number k based on the correlation between the signal intensity and the signal number of the first digitization data 670 and the second digitization data 660. In the case where it is determined that the moving speed of the moving grid 503 is constant, the stop position is detected as ak/p from the proportional relation between the number p of signals for one period and the number k of signals at the stop position, where a is the length of one pitch of the stationary grid 504.

In the case where the moving speed of the moving grid 503 has changed, on the other hand, the signal number k of the first digitization data 670 is compared with the signal number j and the number p of the signals of the second digitization data 660. Assuming that the moving grid 503 covers the distance of one period at the same speed as in the time length 656, the number q of the signals estimated to be acquired during the particular length of the period is given as q=pk/j. It is assumed here that the moving speed is proportional during two adjacent lengths of time and constant in each period. From the proportional relation between the numbers q and k of the signals, the position at which the grid stops is determined as ak/q. From this fact, according to this invention, the grid position can be detected based on the data detected during measurement without using a reference table even in the case where the signal intensity changes nonlinearly.

Now, a measure will be presented to determine the appropriate length of the digitization sampling period for producing a digitized signal. The shorter the sampling period, the greater the number of signals per period for a correspondingly improved measurement resolution. Specifically, the resolution of measurement is determined by the sampling period. Assume, for example, that the length a of one pitch of the stationary grid 504 is 10 $\mu$m and the travel speed of the moving grid (probe) 503 is 1 m/sec. For realizing the resolution of 0.1 $\mu$m by segmenting the interval of 10 $\mu$m into 100 parts, the sampling frequency is set to 10 MHz.

It will thus be understood from the foregoing description that with the dimension measuring apparatus according to the sixth embodiment, the pitch of the moving grid is lengthened as compared with the pitch of the stationary grid so that the effect of the diffractive expansion is reduced thereby to generate two-phase signals with the transmitted light intensity changing substantially linearly. At the same time, only the intensity in an area where the intensity change rate of the two-phase signals is high is selectively detected. The moving distance of not more than one grid pitch can be detected with high resolution by calculating the correlation of the signal intensity and the correlation between the digitized signal intensity and the number of signals in this area of a high intensity change rate.

What is claimed is:

1. A dimension measuring apparatus comprising:
    a moving member adapted to move for dimension measurement;
    grid means for moving with said moving member and having such a pattern that the light transmission distribution is continuously changed along the longitudinal direction;
    optical means for irradiating said grid means;
    a light receiving unit for receiving the light radiated from said optical means and transmitted through said grid means and for generating a one-phase signal in accordance with the movement of said moving member; and
    a processing means for measuring the moving distance by said moving member based on said one-phase signal.

2. The dimension measuring apparatus of claim 1, wherein said one-phase signal is a non-sinusoidal wave signal.

3. The dimension measuring apparatus of claim 1, wherein said grid means is configured with one moving grid for repeating said pattern at a predetermined pitch; and
    said optical means is a laser optical system for radiating a sheet-like laser beam having a spot width shorter than the length of said predetermined pitch.

4. The dimension measuring apparatus of claim 3, wherein said pattern is laterally nonsymmetric with respect to the center line of said predetermined pitch perpendicular to the longitudinal direction of said grid means.

5. The dimension measuring apparatus of claim 3, wherein said pattern is a triangle with the width between the two sides thereof continuously changing along the moving direction of said moving grid.

6. The dimension measuring apparatus of claim 5, wherein the intensity of said one-phase signal changes in saw-toothed wave form in accordance with the movement of said moving grid, and said saw-toothed waveform changes by one cycle with the movement of said moving grid by said predetermined pitch.

7. The dimension measuring apparatus of claim 6, wherein said pattern has a shape corrected by such a curve that the nonlinear change of said saw-toothed waveform in said one-phase signal is offset by the Gauss intensity distribution characteristic of said sheet-like laser beam.

8. The dimension measuring apparatus of claim 3, further comprising a slit or a pinhole disposed between said moving grid and said light receiving means for passing only part of the light transmitted through said moving grid.

9. The dimension measuring apparatus of claim 3, wherein said processing means includes;

a moving direction determining unit for determining the moving direction of said moving member, from the change of the intensity of said one-phase signal, a integral pitch distance detection unit for detecting the moving distance equal to an integer multiple of the length of said predetermined pitch of said moving grid with one cycle of said one-phase signal as a reference;

a fraction pitch distance detection unit for detecting the intensity of said one-phase signal at each of the start position and the stop position of said moving grid and thereby detecting the moving distance of said moving grid not more than the length of said pitch, and a dimension calculation unit for calculating the sum of the moving distances of said moving grid detected by said integral pitch distance detection unit and said fraction pitch distance detection unit and thereby measuring the moving distance of said moving member.

10. The dimension measuring apparatus of claim 9, wherein said moving direction determination unit detects the inversion of the moving direction of said moving grid by detecting the state in which the intensity of said one-phase signal decreases or increases, from the state in which said one-phase signal increases or decreases, respectively.

11. The dimension measuring apparatus of claim 10, wherein said fraction pitch distance detection unit measures the moving distance of not more than said predetermined pitch of said moving grid by carrying out the proportionality calculation between the intensity of said one-phase signal detected at the start position and the stop position of said moving grid and reference intensities including the minimum intensity and the maximum intensity of said one-phase signal.

12. The dimension measuring apparatus of claim 1, wherein said grid means includes a first grid having a translucent portion and an opaque portion alternating at a predetermined pitch along the longitudinal direction and a second grid having said pattern repeated at said predetermined pitch, and wherein said first or second grid moves with said moving member while the other grid is fixed.

13. The dimension measuring apparatus of claim 12, wherein the width of said translucent portion and the width of said opaque portion of said first grid are different from each other.

14. The dimension measuring apparatus as described in claim 12, wherein said pattern of said second grid is a triangle with the width between the two sides thereof changing continuously along the longitudinal direction of said moving grid.

15. The dimension measuring apparatus of claim 12, wherein said triangle of said second grid is an equilateral triangle, and the apex of said equilateral triangle is located intermediate of the pitches of said first grid.

16. The dimension measuring apparatus of claim 12, wherein said first grid moves with said moving member, and said second grid is formed integrally on the light receiving surface of said light receiving means.

17. The dimension measuring apparatus of claim 12, wherein said one-phase signal has a intensity of said one-phase signal changes in sawtoothed waveform in accordance with the movement of said moving grid, said saw-toothed waveform changes by one cycle with the movement of said moving grid by said predetermined pitch, a intensity of said one-phase signal has an ascendant area where the intensity thereof increases and a descendant area where the intensity thereof decreases, said ascendant area and said descendant area have different widths, and a intensity of said one-phase signal changes nonsymmetrically in accordance with the moving direction of said moving grid.

18. The dimension measuring apparatus of claim 17, wherein said processing means includes;

a differential intensity detection unit for detecting the difference of the intensity change of said one-phase signal and outputting a difference signal, a moving direction determination unit for determining the moving direction of said moving member from the intensity change of said one-phase signal and said difference signal, an integral pitch distance detection unit for detecting the moving distance equal to an integer multiple of the length of said predetermined pitch of said moving grid with one cycle of said one-phase signal as a unit, a fraction pitch distance detection unit for detecting the intensity of said one-phase signal at each of the start position and the stop position of said moving grid and thereby detecting the moving distance of said moving grid not more than the length of said predetermined pitch, and a dimension calculation unit for calculating the sum of the moving distances of said moving grid detected by said integral pitch distance detection unit and said fraction pitch distance detection unit and thereby measuring the moving distance of said moving member.

19. The dimension measuring apparatus of claim 18, wherein said integral pitch distance detection unit detects the number of movements indicating the number of said predetermined pitches covered by the movement of said moving grid from the position where the intensity of said one-phase signal assumes a minimum level to the position where the intensity of said one-phase signal assumes the next minimum level through the position where the intensity of said one-phase signal assumes a maximum level or from the position where the intensity of said one-phase signal assumes a maximum level to the position where the intensity of said one-phase signal assumes the next maximum level through the position where the intensity of said one-phase signal assumes a minimum level.

20. The dimension measuring apparatus as described in claim 19, wherein said moving direction determination unit determines whether the intensity of said one-phase signal is located in said ascendant area or said descendant area from the differential intensity or the sign of said differential intensity detected by said differential intensity detection unit before and after the movement of said moving grid, and detects the inversion of said moving grid from the change in the differential intensity or the sign of the differential intensity detected by said differential intensity detection unit during the movement of said moving grid over next one of said predetermined pitch.

21. The dimension measuring apparatus of claim 19, wherein said fraction pitch distance detection unit includes;

a stop position intensity storage unit for detecting and storing the intensity of said one-phase signal for each of said start position and said stop position of said moving grid, a maximum and minimum intensity storage unit for detecting and storing the maximum intensity and the minimum intensity of said one-phase signal in the neighborhood of each of said start position and said stop position, an intensity area determination unit for determining whether each of said start position and said stop position is located in said ascendant area or in said descendant area, from the differential intensity or the sign of the differential intensity detected by said differential intensity detection unit after the movement start and before the stop of said moving grid, and a grid position correlating unit for indicating the correlation between the intensity of said one-phase signal in said ascendant area and said descendant area in said predetermined pitch and the position of said moving grid in accordance with the ratio of the width between said ascendant area and said descendant area of said one-phase signal.

22. The dimension measuring apparatus of claim 21, wherein said grid position correlating unit detects said start position and said stop position of said moving grid by carrying out the proportionality calculation between the intensity of said one-phase signal detected at said start position and said stop position of said moving grid and said reference intensities including the maximum intensity and the minimum intensity of said one-phase signal stored in said maximum and minimum intensity storage unit.

23. The dimension measuring apparatus of claim 1, wherein said grid means includes a moving grid moving with said moving member and having a translucent portion and an opaque portion alternating at a first pitch along the longitudinal direction, and a stationary grid having said pattern repeated at a second pitch different from said first pitch.

24. The dimension measuring apparatus of claim 23, wherein said first pitch is set to an integer (2 or more) multiple of said second pitch, and said stationary grid has, in said second pitch, a first area where said pattern is located and a second area where only the translucent area is located.

25. The dimension measuring apparatus of claim 24, wherein said pattern is a triangle continuously changing in the longitudinal direction of said moving grid, and the width of said translucent portion of said moving grid is set to (ma+(a−b)) and the width of said opaque portion is set to ((n−1)a+b), where the length of said first area is a, the length of said second area is b, and n and m are integers.

26. The dimension measuring apparatus of claim 23, wherein said stationary grid is formed integrally on the light receiving surface of said light receiving means.

27. A dimension measuring apparatus comprising:

a moving member adapted to move for dimension measurement;

grid means for moving with said moving member;

optical means for irradiating said grid means;

light receiving means for receiving the light radiated from said optical means and transmitted through said grid means and for generating an output signal in accordance with the movement of said moving member; and a processing means for generating digitized signals temporally digitized by sampling said output signal and measuring the moving distance of said moving member by counting the number of said digitized signals, wherein said output signal is a non-sinusoidal wave signal, and wherein said grid means includes a first grid having a translucent portion and an opaque portion alternating at a predetermined pitch along the longitudinal direction, and a second grid having such a pattern repeated at said predetermined pitch that the light transmission distribution continuously changes along the longitudinal direction, said first grid or said second grid moving with said moving member as a moving grid while the other grid is fixed as a stationary grid, said output signal is a one-phase signal, and said processing means measures the moving distance of not more than said predetermined pitch of said moving grid by counting the number of said digitized signals.

28. The dimension measuring apparatus of claim 27, wherein said stationary grid is formed integrally on the light receiving surface of said light receiving means.

29. The dimension measuring apparatus of claim 27, wherein said processing means includes;

a first moved pulse number detection unit for detecting and storing the first number of the moved pulses constituting the number of said digitized signals for each of the moving time from the start position of said moving grid to the next grid reference position and the moving time from the grid reference position immediately before the stop of said moving grid to said stop position, a second moved pulse number detection unit for detecting and storing the second number of the moved pulses constituting the number of said digitized signals during the movement of said moving grid in said predetermined pitch, and a fraction pitch distance calculation unit for detecting the moving distance not more than said predetermined pitch from the start position of said moving grid to the next grid reference position and the moving distance from the grid reference position immediately before the stop of said moving grid to said stop position, based on the ratio between said first number of the moved pulses and said second number of the moved pulses and the length of said predetermined pitch.

30. The dimension measuring apparatus of claim 29, wherein said processing means further includes a reference moved pulse number estimation unit for estimating the number of the reference moved pulses during the time when said moving grid moves in said predetermined pitch, based on the change of said second number of the second moved pulses, and in the case where the moving speed of said moving grid changes, said fraction pitch distance calculation unit detects the moving distance not more than said predetermined pitch from the start position of said moving grid to the next grid reference position and the moving distance from the grid reference position immediately before the stop of said moving grid to the stop position, based on the ratio between said first number of moved pulses and said reference number of moved pulses.

31. The dimension measuring apparatus of claim 27, wherein when said moving grid moves and said processing means estimates the change of the moving speed of said moving grid from the change of the number of said digitized signals detected during a specified time and thereby detects the inversion of the moving direction of said moving grid.

32. The dimension measuring apparatus of claim 31, wherein said first pitch is set to a length equal to an odd integer multiple of said second pitch, and said two photodetectors are arranged in parallel by being shifted the distance of substantially one fourth of said second pitch.

33. The dimension measuring apparatus of claim 27, wherein said grid means includes a moving grid moving with said moving member and alternating between a translucent portion and an opaque portion at a first pitch along the longitudinal direction and two stationary grids alternating between a translucent portion and an opaque portion along the longitudinal direction at a second pitch different from said first pitch, said light receiving means includes two photodetectors corresponding to said two stationary grids, respectively, and generates two-phase output signals, and said processing means generates two digitized signals corresponding to said two-phase output signals, respectively.

34. The dimension measuring apparatus of claim 33, wherein said two-phase output signals are two-phase non-sinusoidal wave signals.

35. The dimension measuring apparatus of claim 33, wherein said first pitch is set to a length equal to an odd integer (3 or more) multiple of said second pitch, said two stationary grids are arranged in parallel by being shifted the distance of substantially one fourth of said second pitch, and each time said moving grid moves the distance equal to said second pitch, said two-phase signals change with a period corresponding to said second pitch substantially linearly within a specified range of said period.

36. The dimension measuring apparatus of claim 33, wherein said two stationary grids are formed integrally on the light receiving surface of said two photodetectors, respectively.

37. The dimension measuring apparatus of claim 36, wherein said to stationary grids are arranged at a position the Fourier image distance away from said moving grid nearer to said optical means in the neighborhood of a position said first pitch away from said moving grid.

38. The dimension measuring apparatus of claim 33, wherein said processing means includes a digitized information detection unit for detecting the number and intensity of signals for a specified time as digitization data using the digitized signal corresponding to one of said two-phase output signals in the case where said one output signal is located in other than the neighborhood of the maximum intensity or the minimum intensity or using the digitized signal corresponding to one of said two-phase output signals in the case where the other output signal is located in the neighborhood of the maximum intensity or the minimum intensity.

39. The dimension measuring apparatus of claim 38, wherein said processing means includes;

a first digitization data storage unit for detecting, as first digitization data, the digitization data detected by said digitized information detection unit during the time length of not more than one cycle of said two-phase output signals in the neighborhood of said start position and said stop position of said moving grid, a second digitization data storage unit for detecting, as second digitization data, the digitization data detected by said digitized information detection unit during the time length of one cycle of said two-phase output signals immediately after the time length when the digitization data is detected at said start position and during the time length of one period of said two-phase output signals immediately before the time length when the digitization data is detected at said stop position, a digitization data comparator for comparing said first and second digitization data, and a moving grid position detection unit for detecting said start position and said stop position of said moving grid based on the comparison at said digitization data comparator.

40. The dimension measuring apparatus of claim 39, wherein said first and second digitization data storage units detect one of the four quadrants into which one cycle of said two-phase output signals is segmented, based on the intensity of said two-phase output signals, and stores said quadrant while at the same time detecting said digitization data.

41. A dimension measuring apparatus comprising:

a moving member adapted to move for dimension measurement;

a moving grid for moving with said moving member and having a translucent portion and an opaque portion alternating at a first pitch along the longitudinal direction;

two stationary grids having a translucent portion and an opaque portion alternating at a second pitch different from said first pitch along the longitudinal direction, said two stationary grids being arranged one fourth of said second pitch apart from each other;

optical means for irradiating said moving grid and said stationary grids;

two light receiving means for receiving the light radiated from said optical means and transmitted through said stationary grids and generating two-phase output signals in accordance with the movement of said moving member; and processing means for measuring the moving distance of said moving member based on said two-phase output signal, wherein said two-phase output signals are two-phase non-sinusoidal wave signals, and wherein said processing means includes;

a two-phase signal intensity comparator for comparing the magnitude of the intensities of said two-phase output signals and detecting one of the four quadrants into which one cycle of said two-phase output signals is segmented, a signal selector for selecting one of said two-phase output signals in the case where the other two-phase output signal is located in an area in the neighborhood of the maximum intensity or the minimum intensity, based on the result of comparison at said two-phase signal intensity comparator, a linear area intensity detection unit for detecting the intensity, in an area where the intensity linearly changes, of one of said two-phase output signals selected by said signal selector, and a first grid position detection unit for detecting the stop position of said moving grid based on the quadrant detected by said two-phase signal intensity comparator and the intensity detected by said linear area intensity detection unit.

42. The dimension measuring apparatus of claim 41, wherein said two-phase intensity comparator has at least two slice levels of intensity, and determines said quadrant by detecting an area where one of said two-phase output signals is larger or smaller than said slice levels.

43. The dimension measuring apparatus of claim 42, wherein said first grid position detection unit calculates the ratio between the intensity of one said two-phase output signals selected by said signal selector at said start position or said stop position of said moving grid and the maximum value and the minimum value of the intensity detected by said linear area intensity detection unit, and the distance not more than said first pitch of said stationary grids moved by said moving grid is detected in the neighborhood of said start position or said stop position of said moving grid, from said intensity ratio determined by said calculation and said quadrant detected by said two-phase signal intensity comparator.

* * * * *

UNITED STATES PATENT AND TRADEMARK OFFICE
CERTIFICATE OF CORRECTION

PATENT NO. : 6,492,637 B1 Page 1 of 1
DATED : December 10, 2002
INVENTOR(S) : Hiroo Fujita It is certified that error appears in the above-identified patent and that said Letters Patent is hereby corrected as shown below:

Column 49,
Line 54, "light receiving" should read -- a light receiving --.

Column 51,
Line 33, "said to" should read -- said two --.

Column 52,
Line 33, "processing means" should read -- a processing means --.
Line 65, "one said" should read -- one of said --.

Signed and Sealed this

Twelfth Day of October, 2004

JON W. DUDAS
*Director of the United States Patent and Trademark Office*